(12) United States Patent
Youn et al.

(10) Patent No.: US 9,602,954 B2
(45) Date of Patent: Mar. 21, 2017

(54) MOBILE TERMINAL AND METHOD FOR CONTROLLING THE SAME

(71) Applicant: LG Electronics Inc., Seoul (KR)

(72) Inventors: Taeho Youn, Seoul (KR); Yeonjun Kim, Seoul (KR); Byeongtae Lee, Seoul (KR); Seokgyu Han, Seoul (KR); Sejoon Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/705,514

(22) Filed: May 6, 2015

(65) Prior Publication Data

US 2016/0165037 A1    Jun. 9, 2016

(30) Foreign Application Priority Data

Dec. 3, 2014 (KR) ........................ 10-2014-0172407

(51) Int. Cl.
*H04B 7/00* (2006.01)
*H04W 4/00* (2009.01)
*H04W 8/00* (2009.01)
*H04M 1/725* (2006.01)

(52) U.S. Cl.
CPC ......... *H04W 4/005* (2013.01); *H04M 1/7253* (2013.01); *H04W 8/005* (2013.01); *H04M 2250/12* (2013.01)

(58) Field of Classification Search
CPC ................................................. H04M 2250/12
USPC .................. 455/500, 501, 502, 522; 370/310
See application file for complete search history.

(56) References Cited

U.S. PATENT DOCUMENTS

| | | | |
|---|---|---|---|
| 2009/0228820 A1* | 9/2009 | Kim | G06F 3/04817 715/769 |
| 2014/0192208 A1* | 7/2014 | Okincha | H05B 33/0869 348/188 |

* cited by examiner

*Primary Examiner* — Hsin-Chun Liao
(74) *Attorney, Agent, or Firm* — Dentons US LLP

(57) ABSTRACT

The present disclosure relates to a mobile terminal capable of device pairing and a control method thereof. A mobile terminal according to the present disclosure may include a sensor unit configured to sense at least one external terminal provided with a sensor executing a preset function and located within a preset range from the mobile terminal; a display unit configured to display an object corresponding to the sensor and an object corresponding to the sensed at least one external terminal, respectively; and a controller configured to transmit a control signal of the sensor to at least one external terminal selected from the external terminals based on a preset user input applied to each of the displayed objects.

20 Claims, 19 Drawing Sheets

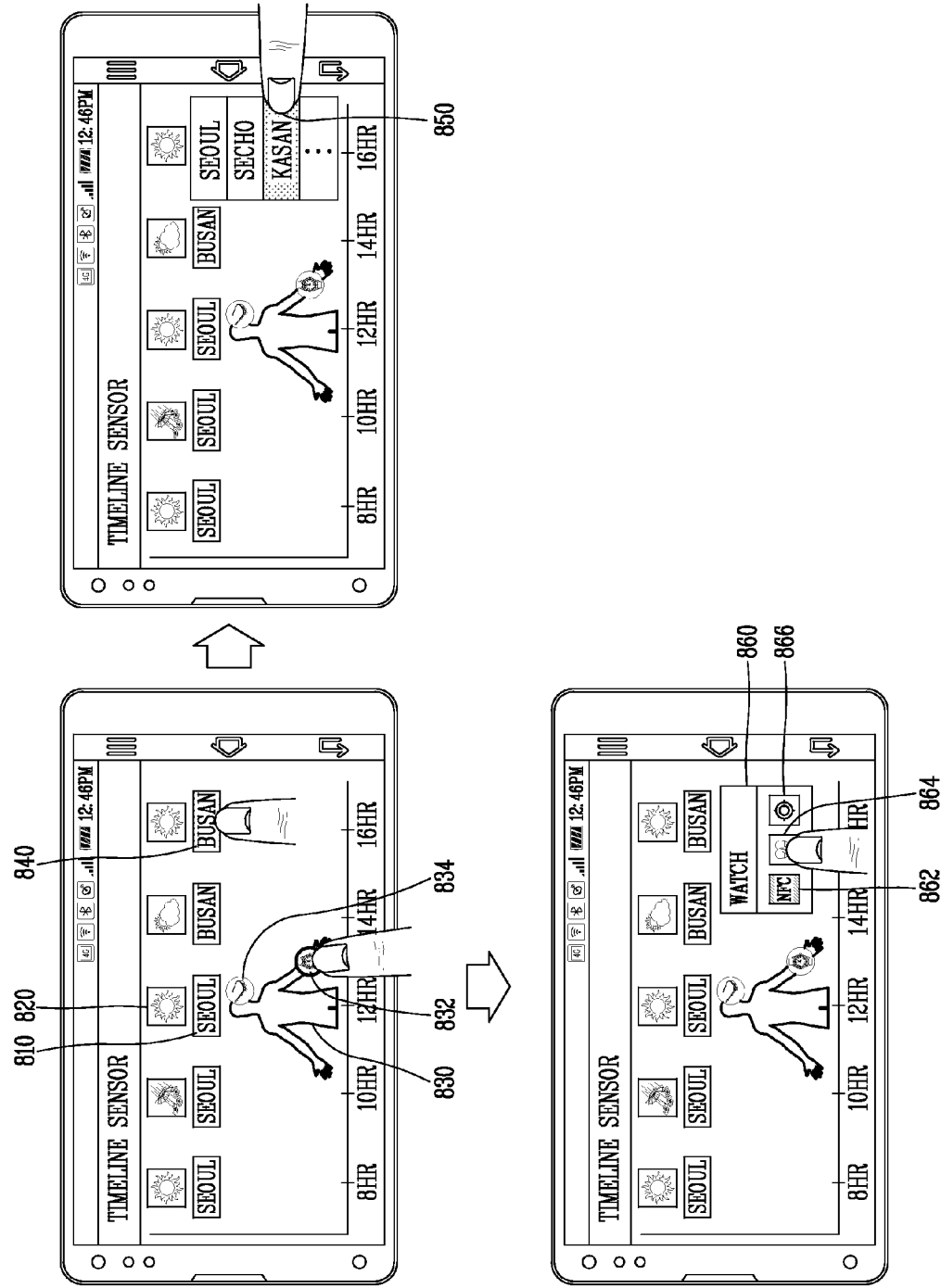

MOBILE TERMINAL AND METHOD FOR CONTROLLING THE SAME

RELATED APPLICATION

This application claims the benefit of priority of Korean Patent Application No. 10-2014-0172407, filed on Dec. 3, 2014, which is herein expressly incorporated by reference in their entireties.

BACKGROUND OF THE INVENTION

1. Field of the Invention

The present disclosure relates to a mobile terminal capable of device pairing and a control method thereof.

2. Description of the Related Art

Terminals may be generally classified into mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

Furthermore, a mobile terminal may be implemented as a wearable device that can be worn on a human body (for example, smart watch, smart glasses, head mounted display (HMD)) and the like. Here, the same sensors may be provided on each wearable device. For example, a GPS sensor may be provided in a watch type terminal and a glasses type terminal.

As the same GPS sensor is carried out in such a plurality of wearable devices, it may cause a problem such as an increase of unnecessary power consumption, derivation of different GPS information on each wearable device, and the like.

SUMMARY OF THE INVENTION

An aspect of the present disclosure is to solve the foregoing problem and other problems. Another aspect of the present disclosure is to provide a mobile terminal capable of controlling the operation of a sensor provided in a sensed external terminal and a control method thereof.

In order to accomplish the above and other objects, according to an aspect of the present disclosure, there is provided a mobile terminal including a sensor unit configured to sense at least one external terminal provided with a sensor executing a preset function and located within a preset range from the mobile terminal; a display unit configured to display an object corresponding to the sensor and an object corresponding to the sensed at least one external terminal, respectively; and a controller configured to transmit a control signal of the sensor to at least one external terminal selected from the external terminals based on a preset user input applied to each of the displayed objects.

According to an embodiment, the controller may transmit an ON control signal of the sensor to the selected at least one external terminal, and transmit an OFF control signal of the sensor to the remaining external terminals excluding the selected at least one external terminal.

According to an embodiment, the controller may transmit an ON control signal of the sensor to a first external terminal based on an input applied to drag an icon corresponding to the sensor to an icon corresponding to the first external terminal which is one of the sensed at least one external terminal.

According to an embodiment, the controller may display a plurality of icons corresponding to a plurality of sensors, respectively, provided in a first external terminal based on a preset touch input applied to an icon corresponding to the first external terminal which is one of the sensed at least one external terminal, and transmit an ON control signal of a sensor corresponding to an icon to which a preset touch input is applied to the first external terminal, based on the preset touch input applied to one of the plurality of icons.

According to an embodiment, the display unit may receive a touch input for selecting a sensor on which the function is executed at a time and an external terminal on which the function of the sensor is executed at the time for each preset time.

According to an embodiment, the controller may transmit an ON control signal of the selected sensor to the selected external terminal when the time arrives based on a result of the received touch input.

According to an embodiment, the controller may execute a function of the sensor on a second external terminal to which a lower priority is given when a preset condition is not satisfied in connection with the function execution of the sensor on a first external terminal to which a higher priority is given, based on priorities given to the sensed at least one external terminal, respectively, for the function execution of the sensor.

According to an embodiment, the controller may execute a function of the sensor on a second external terminal to which a lower priority is given when a user's input event corresponding to the function execution of the sensor does not occur within a preset period of time on a first external terminal to which a higher priority is given, based on priorities given to the sensed at least one external terminal, respectively, for the function execution of the sensor.

According to an embodiment, the controller may change priorities given to the sensed at least one external terminal, respectively, for the function execution of the sensor, based on a preset touch input being applied thereto.

According to an embodiment, the controller may execute a function of the sensor on a second external terminal to which a lower priority is given when a preset condition is not satisfied in connection with the function execution of the sensor on a first external terminal to which a higher priority is given in a current mobile terminal user's state, based on priorities at which the function of the sensor is executed, given to the sensed at least one external terminal, respectively, for each preset mobile terminal user's state.

According to an embodiment, the controller may change priorities given to the sensed at least one external terminal, respectively, for each of the preset mobile terminal user's state, based on a preset touch input being applied thereto.

According to an embodiment, the controller may change priorities given to the sensed at least one external terminal, respectively, for each of the preset mobile terminal user's state, based on history information on a sensor executed in the mobile terminal user's state and an external terminal on which the function of the sensor is executed.

According to an embodiment, the controller may execute a function of the sensor in an external terminal selected in response to an event when the event occurs, based on a user input applied to select an external terminal on which the function of the sensor is executed for each of a plurality of preset events in connection with the sensor.

Furthermore, according to another aspect of the present disclosure, there is provided a control method of a mobile terminal, an the method may include (a) sensing at least one external terminal provided with a sensor executing a preset function and located within a preset range from the mobile terminal; (b) displaying an object corresponding to the sensor and an object corresponding to the sensed at least one external terminal, respectively; and (c) transmitting a control signal of the sensor to at least one external terminal selected from the external terminals based on a preset user input applied to each of the displayed objects.

According to an embodiment, said step of (c) may include transmitting an ON control signal of the sensor to the selected at least one external terminal, and transmitting an OFF control signal of the sensor to the remaining external terminals excluding the selected at least one external terminal.

According to an embodiment, said step of (c) may include transmitting an ON control signal of the sensor to a first external terminal based on an input applied to drag an icon corresponding to the sensor to an icon corresponding to the first external terminal which is one of the sensed at least one external terminal.

According to an embodiment, said step of (c) may include displaying a plurality of icons corresponding to a plurality of sensors, respectively, provided in a first external terminal based on a preset touch input applied to an icon corresponding to the first external terminal which is one of the sensed at least one external terminal, and transmitting an ON control signal of a sensor corresponding to an icon to which a preset touch input is applied to the first external terminal, based on the preset touch input applied to one of the plurality of icons.

According to an embodiment, said step of (c) may include controlling a function of the sensor to be executed on a second external terminal to which a lower priority is given when a preset condition is not satisfied in connection with the function execution of the sensor on a first external terminal to which a higher priority is given, based on priorities given to the sensed at least one external terminal, respectively, for the function execution of the sensor.

According to an embodiment, said step of (c) may include controlling a function of the sensor to be executed on a second external terminal to which a lower priority is given when a preset condition is not satisfied in connection with the function execution of the sensor on a first external terminal to which a higher priority is given in a current mobile terminal user's state, based on priorities at which the function of the sensor is executed, given to the sensed at least one external terminal, respectively, for each preset mobile terminal user's state.

According to an embodiment, said step of (c) may include controlling a function of the sensor to be executed in an external terminal selected in response to an event when the event occurs, based on a user input applied to select an external terminal on which the function of the sensor is executed for each of a plurality of preset events in connection with the sensor.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 8 is a conceptual view for explaining an embodiment in which a sensor to be activated depending on a time is designated;

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1A:
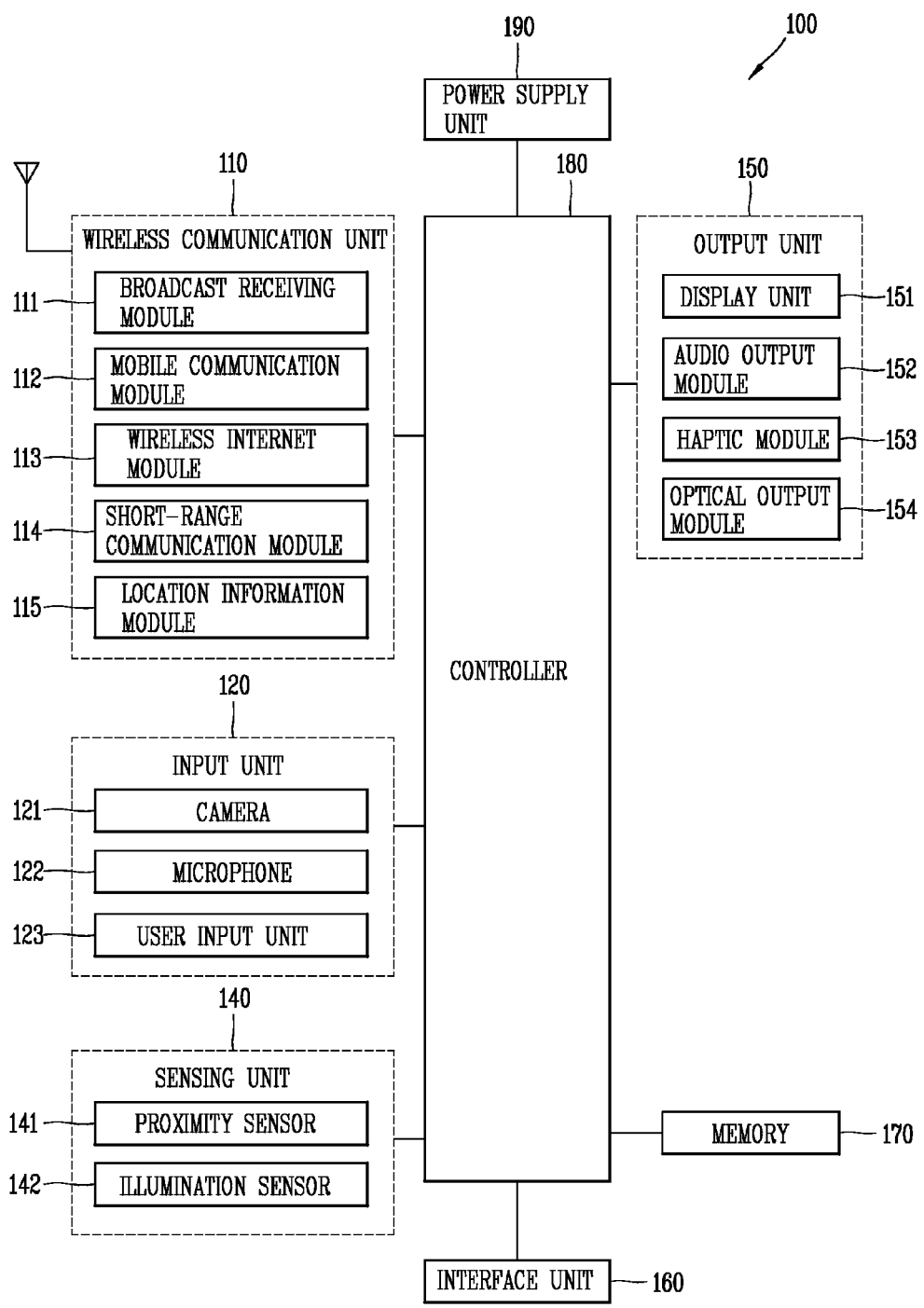
FIG. 1A is a block diagram for explaining a mobile terminal associated with the present disclosure.
Figure 1B:
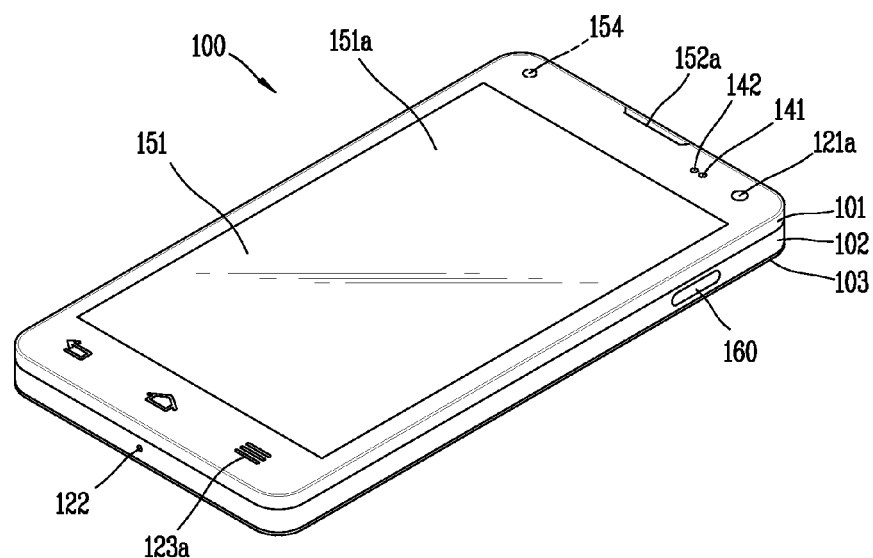
FIGS. 1B and 1C are conceptual views illustrating an example in which a mobile terminal associated with the present disclosure is seen from different directions.
Figure 1C:
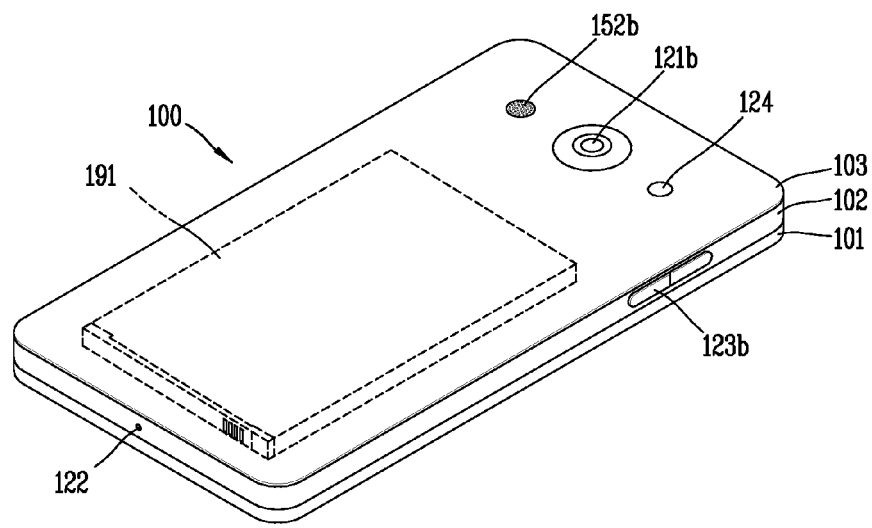

Referring to FIGS. 1A through 1C, FIG. 1A is a block diagram of a mobile terminal in accordance with the present disclosure, FIGS. 1B and 1C are conceptual views of one example of the mobile terminal, viewed from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

Furthermore, the memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), etc.)

The wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), Long Term Evolution (LTE), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, smart glasses or a head mounted display (HMD), which is able to exchange data with the mobile terminal 100 (or to like data with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

Hereinafter, for the sake of brief explanation, a state that the pointer is positioned to be proximate onto the touch screen without contact will be referred to as 'proximity touch,' whereas a state that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images.

The stereoscopic display unit 152 may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a lock state for restricting a user from inputting a control command with respect to applications when a state of the mobile terminal meets a preset condition.

The controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The description in association with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151*a* of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The mobile terminal may include a display unit 151, first and second audio output modules 152*a* and 152*b*, a proximity sensor 141, an illumination sensor 152, an optical output module 154, first and second cameras 121*a* and 121*b*, first and second manipulation units 123*a* and 123*b*, a microphone 122, an interface unit 160 and the like.

Hereinafter, description will be given of an exemplary mobile terminal 100 that the display unit 151, the first audio output module 152*a*, the proximity sensor 141, the illumination sensor 142, the optical output module 154, the first camera 121*a* and the first manipulation unit 123*a* are disposed on the front surface of the terminal body, the second manipulation unit 123*b*, the microphone 122 and the interface unit 160 are disposed on a side surface of the terminal body, and the second audio output module 152*b* and the second camera 121*b* are disposed on a rear surface of the terminal body, with reference to FIGS. 1B and 1C.

Here, those components may not be limited to the arrangement, but be excluded or arranged on another surface if necessary. For example, the first manipulation unit 123*a* may not be disposed on the front surface of the terminal body, and the second audio output module 152*b* may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display (not shown) on a rear surface of the window 151a or patterned directly on the rear surface of the window 151a. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Figure 2:
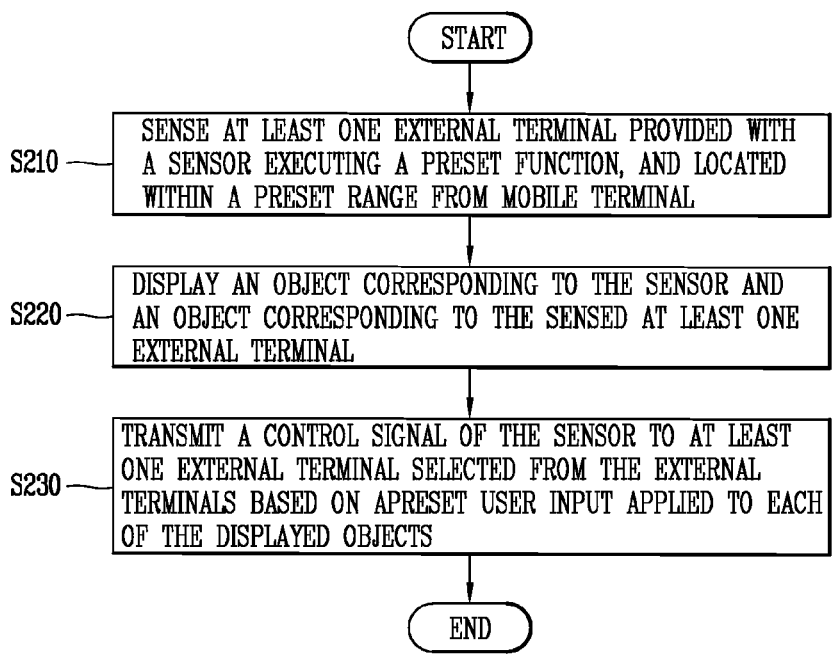
FIG. 2 is a flow chart for explaining an embodiment of a control method of a mobile terminal associated with the present disclosure.

FIG. 2 is a flow chart for explaining an embodiment of a control method of a mobile terminal associated with the present disclosure.

Referring to FIG. 2, first, a sensor for executing a preset function is provided therein, and the process (S210) of sensing at least one external terminal located within a preset range from the mobile terminal 100 is carried out.

The sensor for executing a preset function may include may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone, a battery gauge, an environment sensor (for example, a barometer, a hygrometer, a thermometer, a radiation detection sensor, a thermal sensor, a gas sensor, etc.), a chemical sensor (for example, an electronic nose, a health care sensor, a biometric sensor, etc.), a GPS sensor, and an NFC sensor.

The external terminal may include a mobile terminal and a stationary terminal, and thus may include a mobile terminal such as a cellular phone, a smart phone, a laptop computer, a digital broadcasting terminal, a personal digital assistant (PDA), a portable multimedia player (PMP), a navigator, a slate PC, a tablet PC, a ultrabook, a wearable device (for example, smartwatch, smart glasses, head mounted display (HMD)), and the like, and a stationary terminal such as a digital TV, a desktop computer, a digital signage, and the like.

The preset range may be defined as any location proximate to a current location of the mobile terminal 100.

For an embodiment, the sensor unit 140 may sense a wearable device that is worn by the user of the mobile terminal 100 as the external terminal.

Subsequently, the process (S220) of displaying an object corresponding to the sensor and an object corresponding to the sensed at least one external terminal is carried out.

For an embodiment, an icon corresponding to the sensor and an icon corresponding to the sensed at least one external terminal, respectively, may be displayed on the display unit 151.

Next, the process (S230) of transmitting a control signal of the sensor to at least one external terminal selected from the external terminals based on a preset user input applied to the displayed objects, respectively, is carried out. For an embodiment, the controller 180 may transmit an ON control signal of the sensor to the selected at least one external terminal, and transmit an OFF control signal of the sensor to the remaining external terminals excluding the selected at least one external terminal.

For another embodiment, the controller 180 may transmit an ON control signal of the sensor to a first external terminal based on an input applied to drag an icon corresponding to the sensor to an icon corresponding to the first external terminal which is one of the sensed at least one external terminal.

For still another embodiment, the controller 180 may display a plurality of icons corresponding to a plurality of sensors, respectively, provided in a first external terminal based on a preset touch input applied to an icon corresponding to the first external terminal which is one of the sensed at least one external terminal, and transmit an ON control signal of a sensor corresponding to an icon to which a preset touch input is applied to the first external terminal, based on the preset touch input applied to one of the plurality of icons.

For yet still another embodiment, the display unit 151 may receive a touch input for selecting a sensor on which the function is executed at a time and an external terminal on which the function of the sensor is executed at the time for each preset time.

For still yet another embodiment, the controller 180 may transmit an ON control signal of the selected sensor to the selected external terminal when the time arrives based on a result of the received touch input.

For still yet another embodiment, the controller 180 may execute a function of the sensor on a second external terminal to which a lower priority is given when a preset condition is not satisfied in connection with the function execution of the sensor on a first external terminal to which a higher priority is given, based on priorities given to the sensed at least one external terminal, respectively, for the function execution of the sensor.

For yet still another embodiment, the controller 180 may execute a function of the sensor on a second external terminal to which a lower priority is given when a user's input event corresponding to the function execution of the sensor does not occur within a preset period of time on a first external terminal to which a higher priority is given, based on priorities given to the sensed at least one external terminal, respectively, for the function execution of the sensor.

For still yet another embodiment, the controller 180 may change priorities given to the sensed at least one external terminal, respectively, for the function execution of the sensor, based on a preset touch input being applied thereto.

For yet still another embodiment, the controller 180 may execute a function of the sensor on a second external terminal to which a lower priority is given when a preset condition is not satisfied in connection with the function execution of the sensor on a first external terminal to which a higher priority is given in a current mobile terminal user's state, based on priorities at which the function of the sensor is executed, given to the sensed at least one external terminal, respectively, for each preset mobile terminal user's state.

For still yet another embodiment, the controller 180 may change priorities given to the sensed at least one external terminal, respectively, for each of the preset mobile terminal user's state, based on a preset touch input being applied thereto.

For yet still another embodiment, the controller 180 may change priorities given to the sensed at least one external terminal, respectively, for each of the preset mobile terminal user's state, based on history information on a sensor executed in the mobile terminal user's state and an external terminal on which the function of the sensor is executed.

For still yet another embodiment, the controller may execute a function of the sensor in an external terminal selected in response to an event when the event occurs, based on a user input applied to select an external terminal on which the function of the sensor is executed for each of a plurality of preset events in connection with the sensor.

On the other hand, a mobile terminal may extend to a wearable device that can be worn on a human body, beyond allowing a user to usually use the mobile terminal while grabbing it with his or her hand. Examples of the wearable device may include a smart watch, smart glasses, a head mounted display (HMD), and the like. Hereinafter, the examples of a mobile terminal extended to the wearable device will be described.

A wearable device may exchange (or link) data with another mobile terminal 100. The short-range communication module 114 may sense (recognize) a wearable device capable of communicating with the mobile terminal in the vicinity of the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

Figure 3:
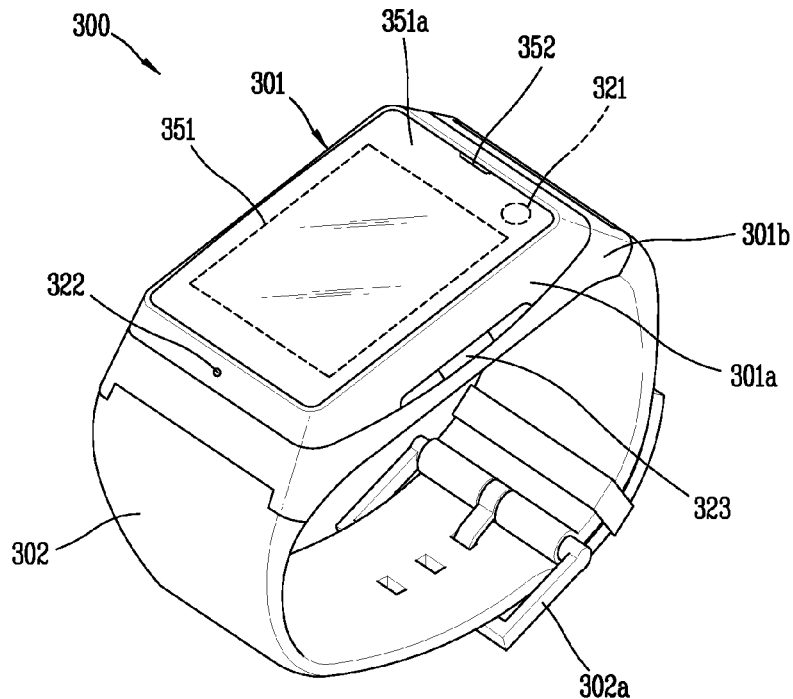
FIG. 3 is a perspective view illustrating an example of a watch type mobile terminal associated with another embodiment of the present disclosure.

FIG. 3 is a perspective view illustrating one example of a watch type mobile terminal 300 in accordance with another exemplary embodiment.

As illustrated in FIG. 3, the watch type mobile terminal 300 may include a main body 301 with a display unit 351, and a band 302 connected to the main body 301 to be wearable on a wrist. Here, the display unit 351 may be provided in the main body 301, but the present disclosure may not be necessarily limited to this. In other words, the present disclosure may be implemented in a band type with no additional display unit 351. Meanwhile, the watch type mobile terminal 300 may include the features of the mobile terminal 100 in FIGS. 1A through 1C or similar features thereof.

The main body 301 may include a case defining an appearance. As illustrated, the case may include a first case 301*a* and a second case 301*b* cooperatively defining an inner space for accommodating various electronic components. However, the present disclosure may not be limited to this. One case may be configured to define the inner space, thereby implementing a mobile terminal 300 with a uni-body.

The watch type mobile terminal 300 may be allowed to perform wireless communication, and an antenna for the wireless communication may be installed in the main body 301. The antenna may extend its function using a case. For example, a case including a conductive material may be electrically connected to the antenna so as to extend a ground area or a radiation area.

The display unit 351 may be disposed on a front surface of the main body 301 to output information thereon. The display unit 351 may be provided with a touch sensor so as to implement a touch screen. As illustrated, a window 351*a* of the display unit 351 may be mounted onto the first case 301*a* to form a front surface of the terminal body together with the first case 301*a*.

An audio output module 352, a camera 321, a microphone 322, a user input unit 323 and the like may be disposed on the main body 301. When the display unit 351 is implemented as the touch screen, it may function as the user input unit 323, which may result in excluding a separate key on the main body 301.

The band 302 may be worn on the wrist in a surrounding manner. The band 302 may be made of a flexible material for facilitating the wearing. As one example, the band 302 may be made of fur, rubber, silicon, synthetic resin or the like. The band 302 may also be configured to be detachable from the main body 301. Accordingly, the band 302 may be replaceable with various types of bands according to a user's preference.

On the other hand, the band 302 may be used for extending the performance of the antenna. For example, the band may include therein a ground extending portion (not shown) electrically connected to the antenna to extend a ground area.

The band 302 may be provided with a fastener 302*a*. The fastener 302*a* may be implemented into a buckle type, a snap-fit hook structure, a Velcro type, or the like, and include a flexible section or material. The drawing illustrates an example that the fastener 302*a* is implemented into the buckle type.

Figure 4:
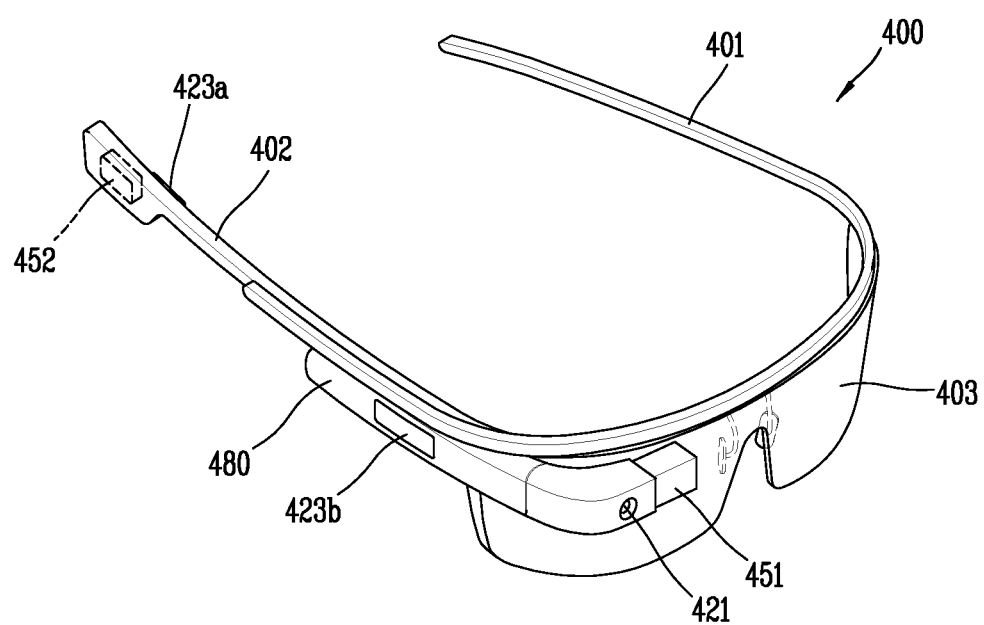
FIG. 4 is a perspective view illustrating an example of a glasses type mobile terminal associated with another embodiment of the present disclosure.

FIG. 4 is a perspective view illustrating one example of a glasses type mobile terminal 400 in accordance with another exemplary embodiment.

The glasses type mobile terminal 400 may be wearable on a head of a human body and provided with a frame part (case, housing, etc.) therefor. The frame part may be made of a flexible material to be easily worn. The drawing exemplarily illustrates that the frame part includes a first frame 401 and a second frame 402 which are made of different materials from each other. In general, the mobile terminal 400 may include the features of the mobile terminal 100 in FIGS. 1A through 1C or similar features thereof.

The frame part may be supported on the head and define a space for mounting various components. As illustrated, electronic components, such as a control module 480, an audio output module 452 and the like, may be mounted to the frame part. Also, a lens 403 for covering at least one of a left eye and a right eye may be detachably coupled to the frame part.

The control module 480 may control various electronic components disposed in the mobile terminal 400. The control module 480 may be understood as a component corresponding to the aforementioned controller 180. The drawing exemplarily illustrates that the control module 480 is installed in the frame part on one side of the head. However, the position of the control module 480 may not be limited to this.

The display unit 451 may be implemented into a type of head mounted display (HMD). The HMD type refers to a displaying method by which a display is mounted to a head so as to show an image directly in front of a user's eyes. In order to provide an image directly in front of the user's eyes when the user wears the glasses type mobile terminal 400, the display unit 451 may be disposed to correspond to at least one of a left eye and a right eye. The drawing exemplarily illustrates that the display unit 451 is located on a portion corresponding to the right eye to output an image toward the user's right eye.

The display unit 451 may project an image into the user's eye using a prism. Also, the prism may be formed transparent such that the user can view both the projected image and a general visual field (a range that the user views through the eyes) in front of the user.

In such a manner, the image output through the display unit 451 may be viewed with overlapping the general visual field. The mobile terminal 400 may provide an augmented reality (AR) of showing a single image by overlaying a virtual image on a realistic image or background using the characteristic of the display.

The camera 421 may be disposed adjacent to at least one of the left eye and the right eye to capture an image in front thereof. Since the camera 421 is located adjacent to the eye, the camera 421 may acquire a scene that the user is viewing as an image.

The drawing exemplarily illustrates that the camera 421 is provided at the control module 480, but the present disclosure may not be limited to this. The camera 421 may be installed on the frame part or provided in plurality to acquire a stereoscopic image.

The glasses type mobile terminal 400 may include user input units 423a and 423b manipulated by the user to input a control command. The user input units 423a and 423b may employ any method if it is a tactile manner allowing the user to perform manipulation with a tactile feeling such as touch, push, or the like. The drawing exemplarily illustrates that the user input units 423a and 423b operable in a pushing manner and a touching manner are disposed on the frame part and the control module 480, respectively.

Also, the glasses type mobile terminal 400 may include a microphone (not shown) which processes input sound into electric audio data, and an audio output module 452 for outputting an audible sound. The audio output module 452 may be configured to transfer the audible sound in a general audio output manner or an osteoconductive manner. When the audio output module 452 is implemented in the osteoconductive manner, the audio output module 452 may be closely adhered onto the head when the user wears the mobile terminal 400 and vibrate the user's skull to transfer sounds.

Hereinafter, embodiments associated with a control method which can be implemented in the mobile terminal having the foregoing configuration will be described with reference to the attached drawings. It should be understood by those skilled in the art that the present invention can be embodied in other specific forms without departing from the concept and essential characteristics thereof.

Furthermore, in the following drawing, the mobile terminal 100 according to the present disclosure will be described as an embodiment in which the sensed external terminal is a wearable device. For an embodiment, the external terminal may be implemented with a mobile terminal or stationary terminal other than the wearable device, and the mobile terminal 100 according to the present disclosure may be implemented with a wearable device.

On the other hand, as described above, the controller 180 may transmit an OFF control signal of the sensor to the remaining external terminals excluding the selected at least one external terminal.

Furthermore, the controller 180 may transmit an ON control signal of the sensor to the first external terminal based on an input applied to drag an icon corresponding to the sensor to an icon corresponding to the first external terminal which is one of the sensed at least one external terminal.

Figure 5A:
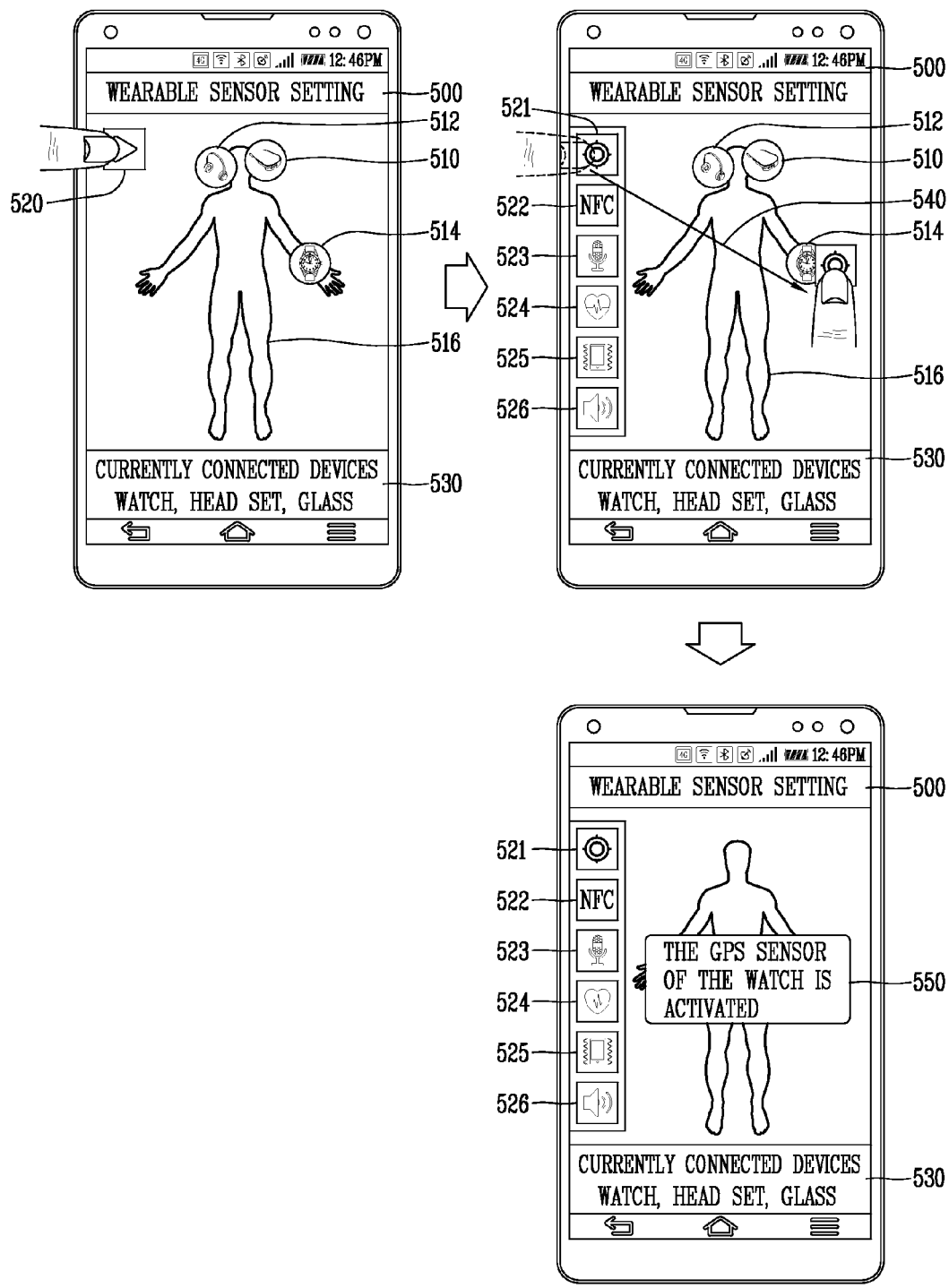
FIGS. 5A, 5B and 5C are conceptual views for explaining an embodiment in which an external terminal on which a sensor is activated is designated.
Figure 5B:
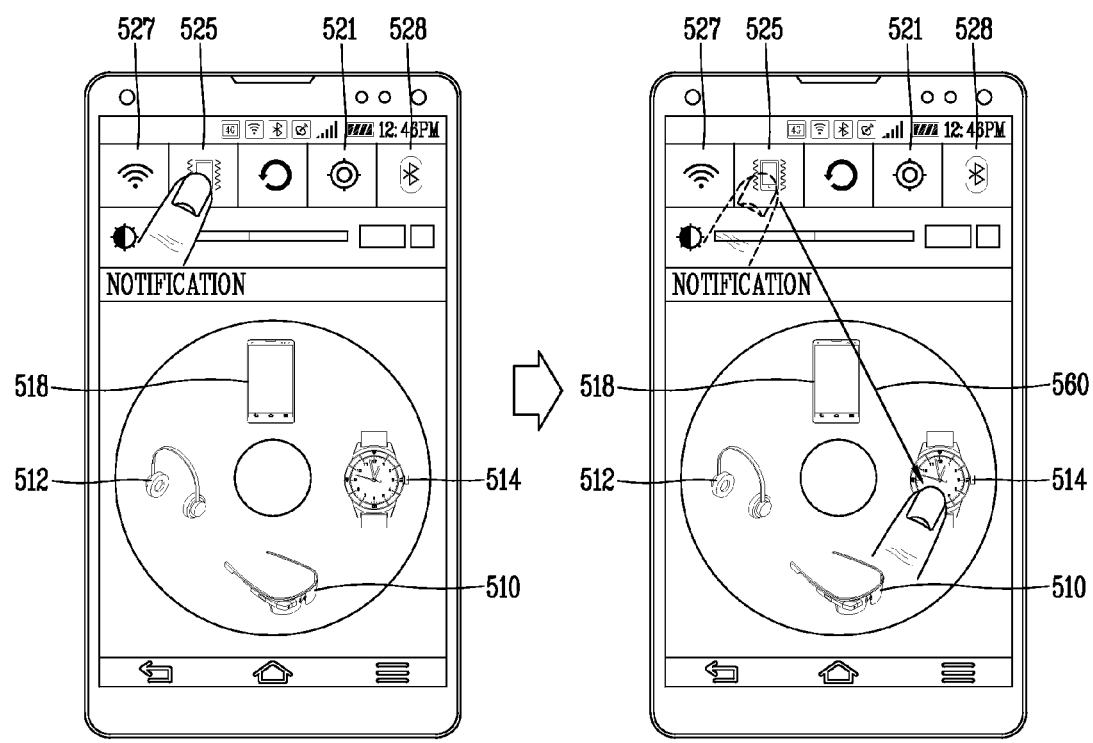
Figure 5C:
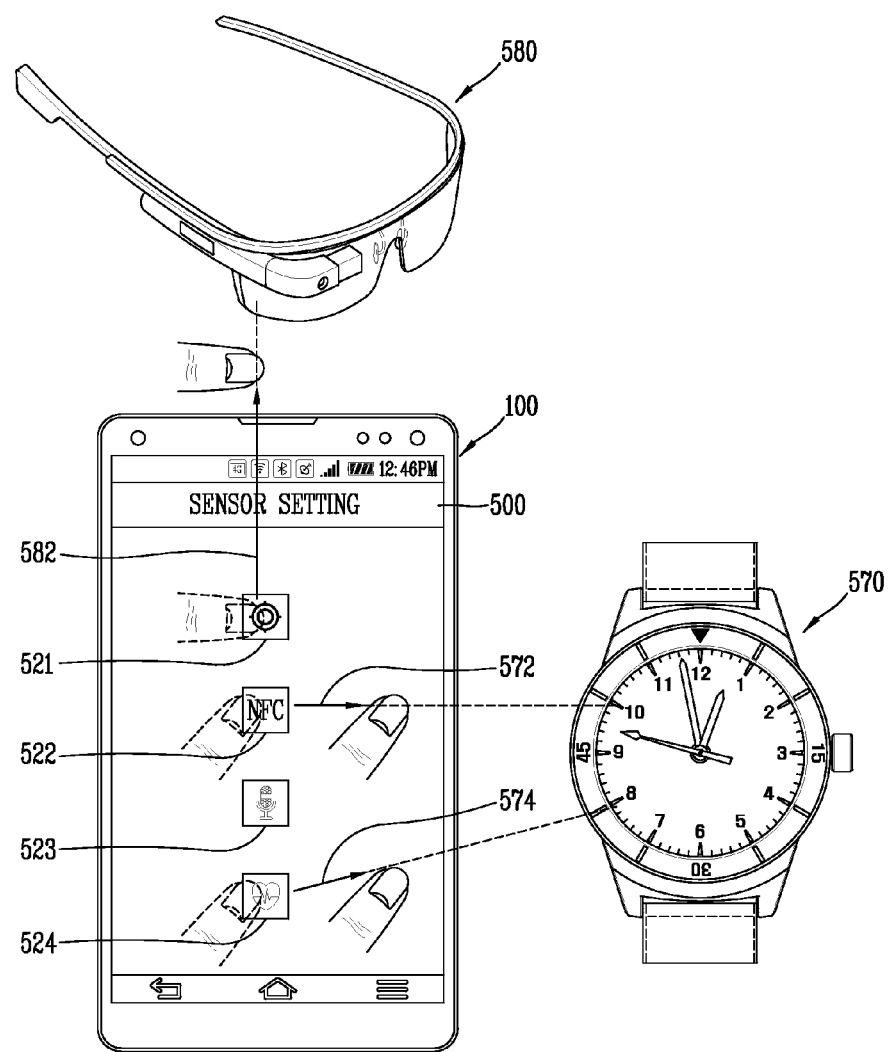

FIGS. 5A, 5B and 5C are conceptual views for explaining an embodiment in which an external terminal on which a sensor is activated is designated.

Referring to FIG. 5A, a setting screen 500 for designating a sensor on which the function is executed to the sensed wearable device (external terminal) may be displayed. For an embodiment, when a new wearable device is sensed or a user applies a touch input to an icon for displaying the setting screen 500, the setting screen 500 may be displayed.

For the setting screen 500, icons 510, 512, 514 corresponding to the sensed wearable devices may be displayed on a human-shaped icon 516. For an embodiment, an icon 510 corresponding to smart glasses, an icon 512 corresponding to a smart headset, and an icon 514 corresponding to a smart watch may be displayed on positions corresponding to an eye, an ear and a wrist of the human-shaped icon 516, respectively. Accordingly, the user may intuitively check the sensed wearable devices.

Furthermore, an icon 520 for displaying icons corresponding to a plurality of sensors and a list 530 of the currently sensed wearable devices. Specifically, the list 530 of the currently sensed wearable devices may include smart glasses, a smart headset, and a smart watch.

Subsequently, the user may apply a preset touch input to the icon for displaying icons corresponding to a plurality of sensors. As a result, icons 521, 522, 523, 524, 525, 526 corresponding to a plurality of sensors may be displayed.

For an embodiment, when the user applies a long touch input to the icon 520, an icon 521 corresponding to a GPS sensor, an icon 522 corresponding to an NFC sensor, an icon 523 corresponding to a voice recognition sensor, an icon 524 corresponding to a heart rate sensor, an icon 525 corresponding to a vibration sensor, and an icon 526 corresponding to an audio output sensor.

Here, the user may apply an input 540 for dragging one 521 of icons 521, 522, 523, 524, 525, 526 corresponding to a plurality of sensors to one 514 of icons 510, 512, 514 corresponding to the sensed wearable devices. For an embodiment, the user may apply an input 540 for dragging an icon 512 corresponding to the GPS sensor to an icon 514 corresponding to the smart watch.

Accordingly, a control signal for activating the GPS sensor provided in the smart watch may be transmitted to the smart watch. Here, a pop-up window 550 for indicating that the GPS sensor of the smart watch is activated may be displayed.

Furthermore, a control signal for deactivating the GPS sensor provided in the smart glasses may be transmitted to the smart glasses which is a sensed wearable device other than the smart watch. Similarly, a control signal for deactivating the GPS sensor provided in the smart headset to the smart headset.

In other words, referring to the embodiment of FIG. 5, the user may activate a GPS function only for the smart watch among a plurality of wearable devices worn by the user. Accordingly, it may be possible to reduce the power consumption of the mobile terminal 100, smart glasses and a smart headset. Furthermore, it may be possible to solve a mismatch problem of the GPS function execution result that can occur when the GPS function is executed by the plurality of terminals.

For another embodiment, referring to FIG. 5B, when the user applies a drag input in a downward direction to the status bar of the terminal 100, a status bar containing an icon 525 corresponding to the sensor.

For example, the status bar may include an icon 527 corresponding to Wi-Fi, an icon 525 corresponding to a vibration sensor, an icon 521 corresponding to a GPS sensor, an icon 528 corresponding to Bluetooth, and the like.

Subsequently, the user may apply a preset touch input to one 525 of icons 527, 525, 521, 528 corresponding to the sensor displayed on the status bar to select it. For example, the user may apply a long touch input to the icon 525 corresponding to a vibration sensor to select the vibration sensor.

Accordingly, icons 510, 512, 514, 518 corresponding to the sensed wearable devices may be displayed. For an embodiment, a circular panel including an icon 510 corresponding to smart glasses, an icon 512 corresponding to a smart headset, an icon 514 corresponding to a smart watch, an icon 518 corresponding to a smart phone, and the like may be displayed.

Next, the user may apply an input 560 for dragging one 525 of the icons 527, 525, 521, 528 corresponding to the sensors displayed on the status bar selected by a preset touch input to one 514 of the icons 510, 512, 514, 518 corresponding to the sensed wearable devices.

For an embodiment, the user may apply an input 560 for dragging an icon 525 corresponding to the vibration sensor to an icon 514 corresponding to the smart watch. Accordingly, a control signal for activating the vibration sensor provided in the smart watch to the smart watch. At this time, a pop-up window indicating that the vibration sensor of the smart watch is activated.

Furthermore, a control signal for deactivating a vibration sensor provided in the smart glasses to the smart glasses which is a sensed wearable device other than the smart watch. Similarly, a control signal for deactivating a vibration sensor provided in the smart headset and smart phone may be transmitted to the smart headset and smart phone, respectively.

For another embodiment, referring to FIG. 5C, the setting screen 500 for designating a sensor on which the function is executed to the sensed wearable device (external terminal). For an embodiment, when a new wearable device is sensed or the user applies a touch input to an icon for displaying the setting screen 500, the setting screen 500 may be displayed.

Specifically, icons 521, 522, 523, 524 corresponding to a plurality of sensors may be displayed on the setting screen 500. For example, an icon 522 corresponding to an NFC sensor, an icon 523 corresponding to a voice recognition sensor, an icon 524 corresponding to a heart rate sensor, and the like may be displayed on the setting screen 500.

Subsequently, the user may apply a preset touch input to one of the icons 521, 522, 523, 524 corresponding to a plurality of sensors to determine a wearable device on which the sensor is to be activated.

For an embodiment, the user may apply a swipe input in a direction at which a wearable device being worn is located to one of the icons 521, 522, 523, 524 corresponding to a plurality of sensors.

Specifically, the user may apply a swipe input 582 in a direction at which the smart glasses 580 are located to the icon 521 corresponding to the GPS sensor. Similarly, the user may apply a swipe input 572, 574 in a direction at which the smart watch 570 is located to the icon 522 corresponding to the NFC sensor and the icon 524 corresponding to the heart rate sensor, respectively.

Accordingly, a control signal for activating the GPS sensor provided in the smart glasses 580 may be transmitted to the smart glasses 580. Similarly, a control signal for activating the NFC sensor and heart rate sensor provided in the smart watch 570 may be transmitted to the smart watch 570.

At this time, the user may tilt or move the mobile terminal 100 to enhance the accuracy of a swipe input in a direction at which the wearable device worn by the user. For an embodiment, the user may stand the mobile terminal 100 vertically upright to apply a swipe input 582 in an upward direction at which the smart glasses 580 is located to the icon 521 corresponding to the GPS sensor.

On the other hand, a default value associated with the function execution of the sensor may be set to the mobile terminal 100 according to the present disclosure. For example, when a swipe input is not applied to the icon 523 corresponding to the voice recognition, a voice recognition function may be carried out in the mobile terminal 100.

On the other hand, the controller 180 may display a plurality of icons corresponding to a plurality of sensors, respectively, provided in a first external terminal based on a preset touch input applied to an icon corresponding to the first external terminal which is one of the sensed at least one external terminal, and transmit an ON control signal of a sensor corresponding to an icon to which a preset touch input is applied to the first external terminal, based on the preset touch input applied to one of the plurality of icons.

Figure 6A:
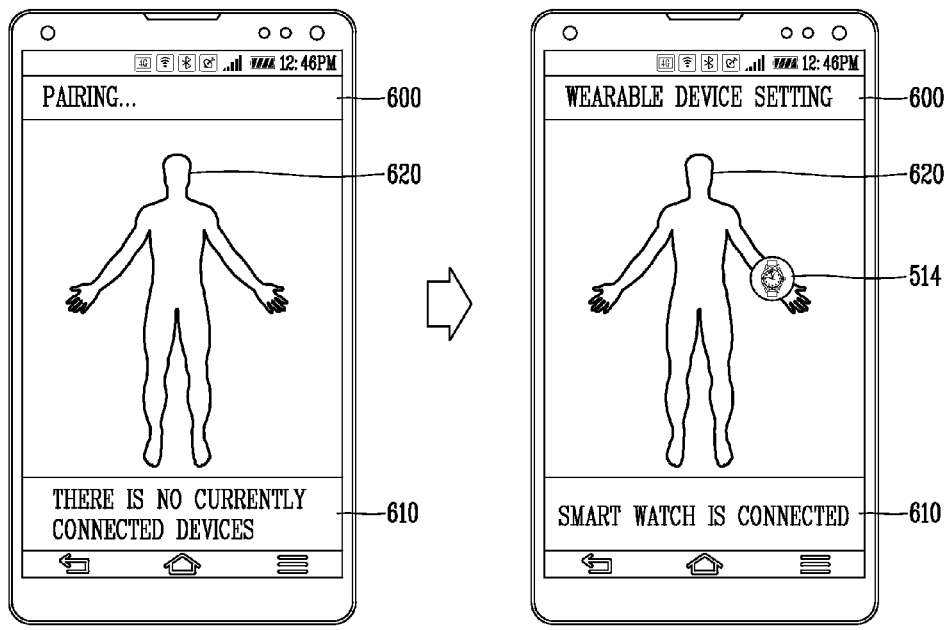
FIGS. 6A and 6B are conceptual views for explaining an embodiment in which an icon corresponding to a sensed external terminal is displayed.
Figure 6B:
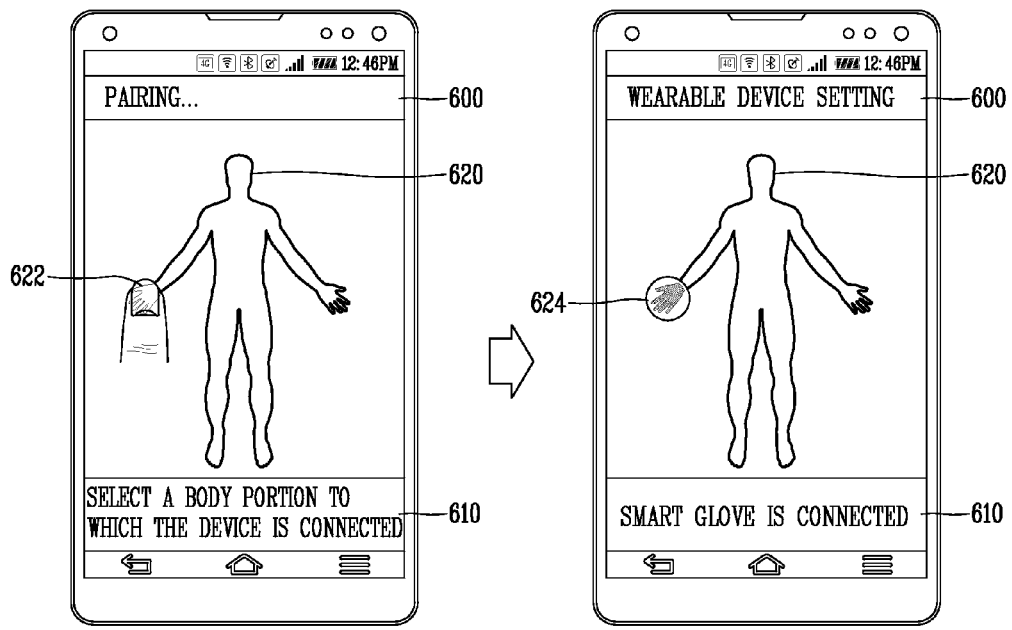

FIGS. 6A and 6B are conceptual views for explaining an embodiment in which an icon corresponding to a sensed external terminal is displayed.

Referring to FIG. 6A, a setting screen 600 for showing a sensed wearable device (external terminal) may be displayed. For an embodiment, when a new wearable device is sensed or a user applies a touch input to an icon for displaying the setting screen 600, the setting screen 600 may be displayed.

The setting screen 600 may include a human-shaped icon 620 and a menu 610 showing a result in which wearable devices are sensed. For example, a message indicating that there is currently no devices connected thereto may be displayed on the menu 610.

On the other hand, as described above, the sensor unit 140 may recognize external terminals. For an embodiment, the sensor unit 140 may recognize them using the names or model numbers of the external terminals transmitted from the external terminals.

For another embodiment, information on external terminals may be received from an additional server to recognize the external terminals. Specifically, when information on external terminals are not transmitted from the external terminals, the names or model numbers of the external terminals being worn by the user may be transmitted from an additional server previously established.

In this manner, when an external terminal is sensed by the sensor unit 140, an icon corresponding to the sensed external terminal may be displayed. For an embodiment, when a smart watch is sensed by the sensor unit 140, an icon 514 corresponding to the smart watch may be displayed at a position corresponding to the wrist of the human-shaped icon 620. Accordingly, the user may intuitively check that the smart watch is sensed. Furthermore, a message indicating that the smart watch is connected thereto may be displayed on the menu 610.

For another embodiment, referring to FIG. 6B, when information on external terminals are not transmitted from the external terminals or additional server as described above, the user may directly input information on the external terminals.

For an embodiment, a message for designating a part of human body connected to the wearable device may be displayed on the menu 610, and accordingly, the user may apply a preset touch input to a position at which the wearable device is worn on the human-shaped icon 620. Specifically, the user may apply a long touch input to a hand portion 622 of the human-shaped icon 620 to input information on a smart glove connected thereto.

For another embodiment, when the existence of an external terminal is recognized by the sensor unit 140 but authentication information on the external terminal is not transmitted from the external terminal or additional server, the external terminal may be connected with a scheme authenticated by the user. More specifically, when the user apply a long touch input to a hand portion 622 of the human-shaped icon 620, a smart glove may be authenticated and connected by the sensor unit 140.

As a result, a message indicating that the smart glove has been connected thereto is displayed on the menu 610, and an icon 624 corresponding to the smart glove may be displayed on the hand portion 622 of the human-shaped icon 620 to which the long touch input has been applied.

Figure 7A:
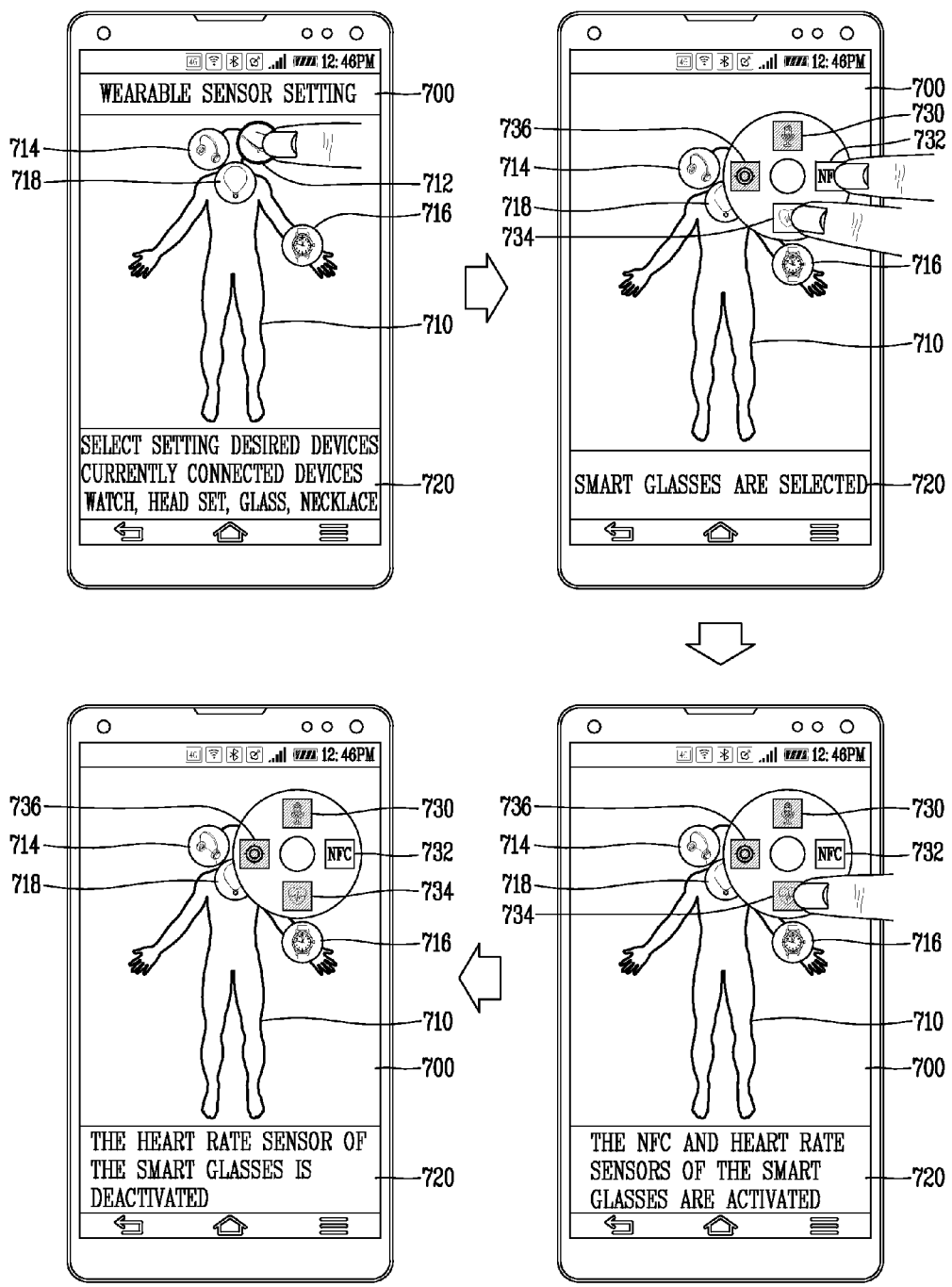
FIGS. 7A, 7B and 7C are conceptual views for explaining an embodiment in which a sensor to be activated on an external terminal is designated.
Figure 7B:
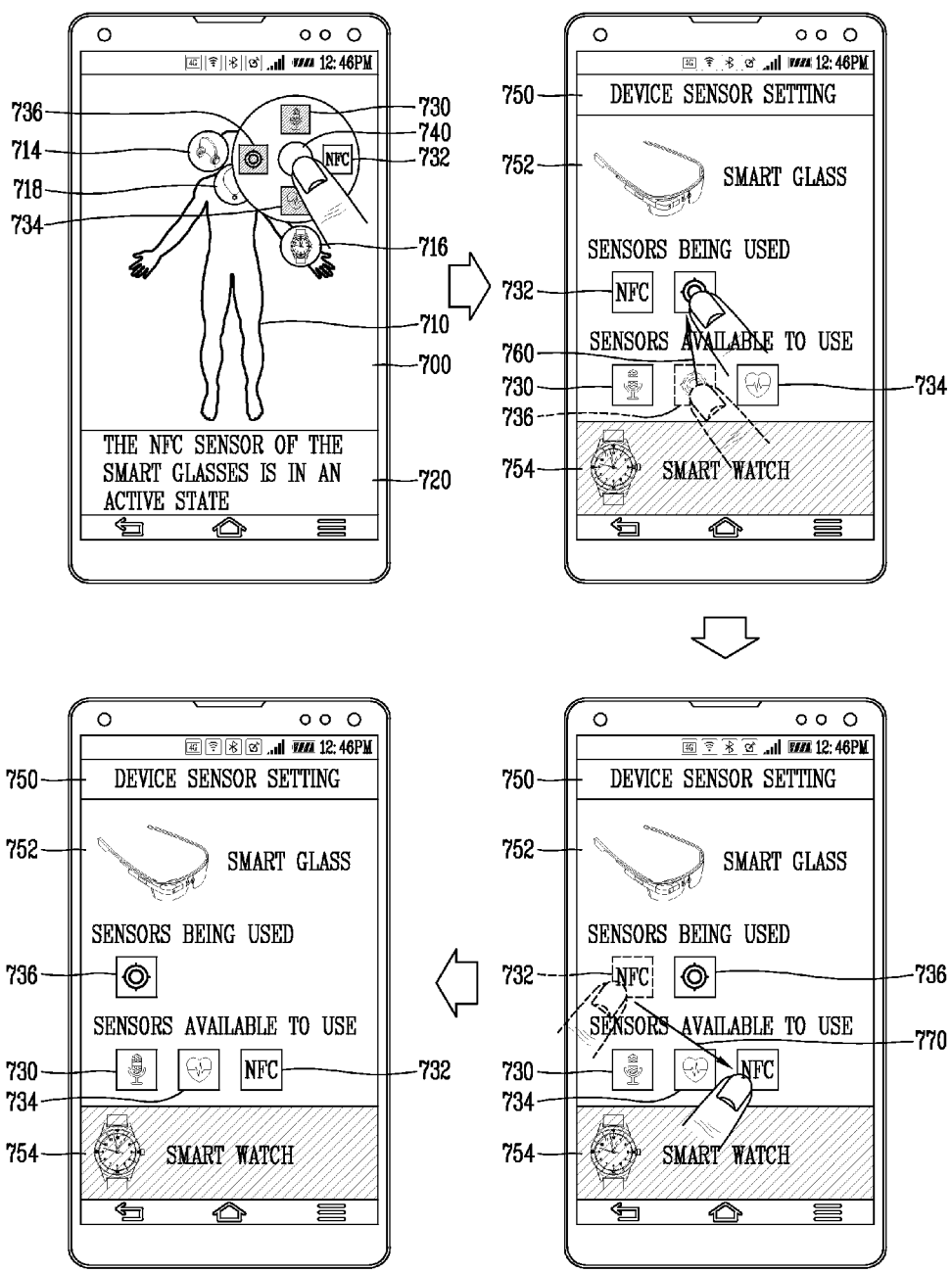
Figure 7C:
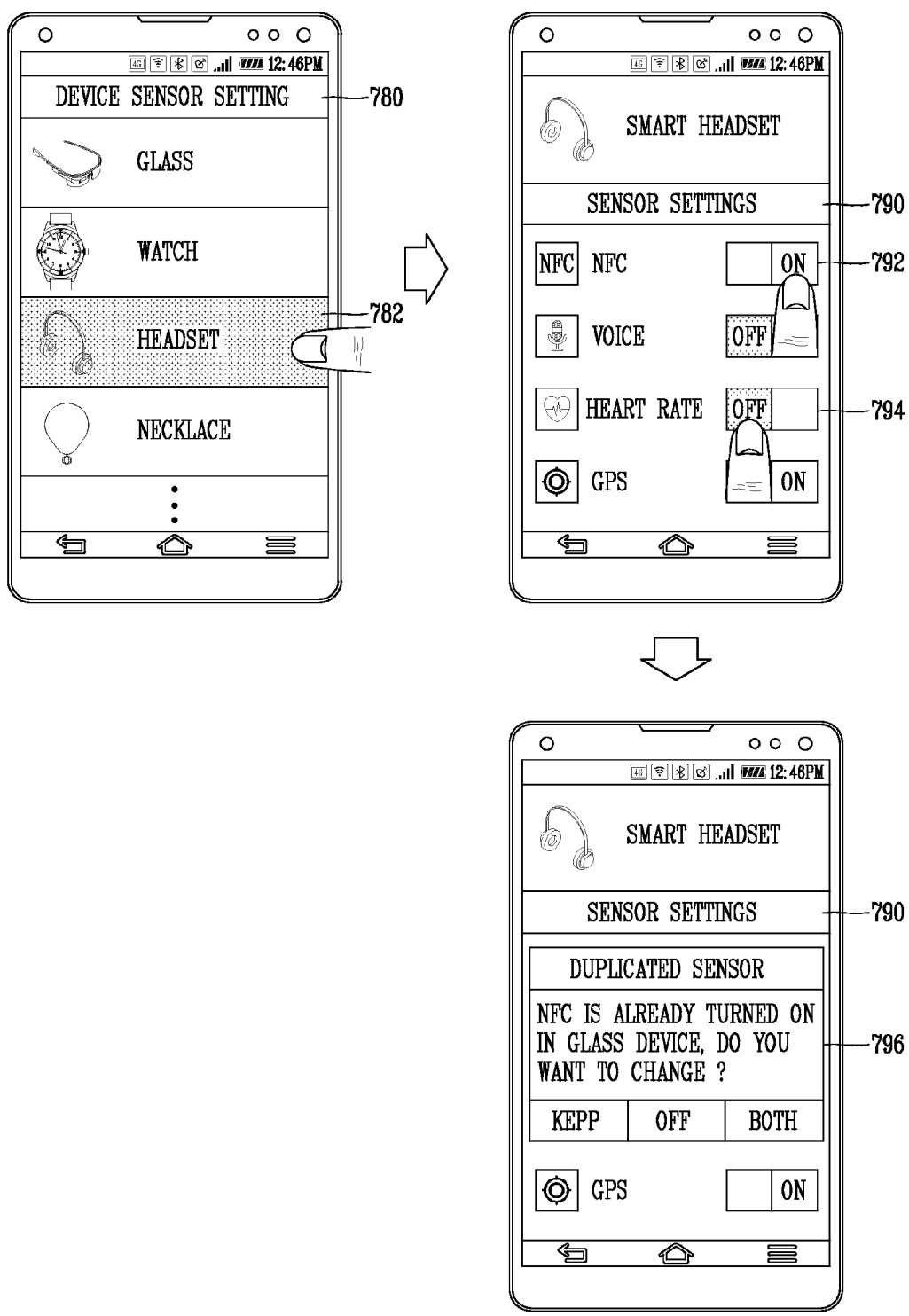

FIGS. 7A, 7B and 7C are conceptual views for explaining an embodiment in which a sensor to be activated on an external terminal is designated.

Referring to FIG. 7A, a setting screen 700 for designating a sensor on which the function is executed to a sensed wearable device may be displayed. For an embodiment, when a new wearable device is sensed or a user applies a touch input to an icon for displaying the setting screen 700, the setting screen 700 may be displayed.

For the setting screen 700, icons 712, 714, 716, 718 corresponding to the sensed wearable devices may be displayed on the human-shaped icon 710. For an embodiment, an icon 712 corresponding to smart glasses, an icon 714 corresponding to a smart headset, an icon 716 corresponding to a smart watch, and an icon 718 corresponding to a smart necklace may be displayed on positions corresponding to an eye, an ear, a wrist and a neck of the human-shaped icon 710, respectively. Accordingly, the user may intuitively check the sensed wearable devices.

Furthermore, a menu 720 for guiding a sensor setting process of the wearable device may be displayed on the human-shaped icon 710. Specifically, a message for selecting a device desired for sensor setting and a message indicating that the smart glasses, smart headset, smart watch and smart necklace is currently connected thereto may be displayed on the menu 720.

Subsequently, the user may apply a preset touch input to one of the icons 712, 714, 716, 718 corresponding to the sensed wearable devices to select a will be described for setting the sensor. For example, the user may apply a long touch input to the icon 712 corresponding to smart glasses to select the smart glasses.

As a result, icons 730, 732, 734, 736 corresponding to a plurality of sensors provided in the smart glasses may be displayed. Specifically, a circular panel including an icon 730 corresponding to a voice recognition sensor, an icon 732 corresponding to an NFC sensor, an icon 734 corresponding to a heat rate sensor, and an icon 736 corresponding to a GPS sensor may be displayed. Furthermore, a message indicating that the smart glasses are selected may be displayed on the menu 720.

Accordingly, the user may apply a preset touch input to part of the displayed icons 730, 732, 734, 736 corresponding to a plurality of sensors, respectively, to set the on/off of the sensors provided in the smart glasses.

For an embodiment, when a long touch input is applied to the icon 732 corresponding to the NFC sensor, the NFC sensor provided in the smart glasses may be activated. Similarly, when a long touch input is applied to the icon 734 corresponding to the heart rate sensor, the heart rate sensor provided in the smart glasses may be activated.

In other words, a control signal for activating the NFC sensor and heart rate sensor may be transmitted to the smart glasses. Furthermore, the icons 732, 734 selected by a long touch input may be clearly displayed, but the icons 730, 736 to which a long touch input is not applied may be displayed along with a dim image effect.

As such a control signal is transmitted to the smart glasses, referring to the lower right end drawing of FIG. 7A, a message indicating that the NFC sensor and heart rate sensor of the smart glasses have been activated may be displayed on the menu 720.

Subsequently, when a long touch input is applied to the icon 734 corresponding to the heart rate sensor again, the state of the heart rate sensor provided in the smart glasses may be switched to an inactive state. In other words, a control signal for deactivating the heart rate sensor may be transmitted to the smart glasses.

As such a control signal is transmitted to the smart glasses, referring to the lower left end drawing of FIG. 7A, a message indicating that the heart rate sensor of the smart glasses has been deactivated may be displayed on the menu 720. Furthermore, a message indicating sensors currently activated on the smart glasses may be displayed. In other words, a message indicating that only the NFC sensor is currently activated on the smart glasses may be displayed (refer to the following FIG. 7B).

Referring to FIG. 7B as an embodiment subsequent to FIG. 7A, a circular panel including icons 730, 732, 734, 736 corresponding to a plurality of sensors provided in the smart glasses may be displayed, and a long touch input may be applied to an environment setting icon 740 contained in the circular panel.

Accordingly, a screen 750 capable of setting the on/off of sensors for each wearable device may be displayed. For an embodiment, the screen 750 may include a screen 752 for the sensor setting of currently selected smart glasses and a screen 754 for the sensor setting of selectable wearable devices.

Specifically, the screen 752 for the sensor setting of currently selected smart glasses may be displayed at the top of the screen 750, and the screen 754 for the sensor setting of selectable wearable devices may be displayed at the bottom thereof with a dim image effect.

For an embodiment, icons corresponding to sensors (sensors in a currently active state) currently being used and icons corresponding to sensors available to use (sensors in a currently inactive state) are separately displayed on the screen 752 for the sensor setting of currently selected smart glasses. Specifically, the icon 732 corresponding to the NFC sensor in a currently active state may be displayed in the top region, and the icon 730 corresponding to the voice recognition sensor, the icon 734 corresponding to the heart rate sensor, and the icon 736 corresponding to the GPS sensor in a currently inactive state may be displayed in the bottom region.

In this state, the user may change an active state of the sensor using a drag input. For an embodiment, the user may apply a drag input 760 in a direction of the top region to the icon 736 corresponding to the GPS sensor.

Accordingly, referring to the lower right end drawing of FIG. 7B, the icon 736 corresponding to the GPS sensor may be moved and displayed in the top region indicating an active state. Furthermore, a control signal for activating the GPS sensor may be transmitted to the smart glasses to activate the GPS sensor of the smart glasses.

Similarly, a drag input 770 in a direction of the bottom region may be applied the icon 732 corresponding to the NFC sensor. As a result, referring to the lower left end drawing of FIG. 7B, the icon 732 corresponding to the NFC sensor may be moved and displayed in the bottom region indicating an inactive state. Furthermore, a control signal for activating the NFC sensor may be transmitted to the smart glasses to switch the NFC sensor of the smart glasses to an inactive state.

On the other hand, the user may apply a long touch input to the screen 754 for sensor setting to change the type of the wearable device for sensor setting. For an embodiment, when the user applies a long touch input to the screen 754 of the sensor setting of a smart watch, the screen 754 may be clearly displayed on the top. Accordingly, the sensor setting screen 752 may be pulled down, and displayed with a dim image effect.

For another embodiment, referring to FIG. 7C, a screen 780 capable of setting the on/off of sensors for each sensed wearable device according to another embodiment may be displayed. Specifically, a list corresponding to the sensed wearable devices, respectively, may be displayed on the screen 780, and the user may apply a long touch input to a list 782 corresponding to a smart headset which is one of them to select the smart headset.

Accordingly, a screen capable of setting the on/off of sensors provided in the smart headset. For an embodiment, an icon and list corresponding to sensors, respectively, provided in the smart headset and a setting bar for setting the on/off of sensors may be displayed on the screen 790.

Specifically, the user may pull the setting bar 792 corresponding to the NFC sensor to the right to switch the NFC sensor provided in the smart headset to an active state. Similarly, the user may pull the setting bar 794 corresponding to the heart rate sensor to the left to switch the heart rate sensor provided in the smart headset to an inactive state.

On the other hand, when the sensor switched to an active state have been previously activated in another wearable device, a pop-up window indicating this may be displayed. Specifically, when a setting bar 792 corresponding to the NFC sensor provided in the smart headset is pulled to the right to sense a touch input for activating the NFC sensor, a pop-up window 796 indicating that the NFC sensor provided in the smart glasses has been being operated may be displayed.

The pop-up window 796 may include an icon (keep) for activating the NFC sensor in only the smart glasses that has been being operated, an icon (off) for newly activating the NFC sensor in only the smart headset, and an icon (both) for activating the NFC sensor in both the smart glasses and smart headset that have been being operated. In other words, the user may apply a touch input to one of the icons to select a device on which the NFC sensor is to be operated.

On the other hand, the display unit 151 may receive a touch input for selecting a sensor on which the function is executed at a time and an external terminal on which the function of the sensor is executed at the time for each preset time.

Furthermore, the controller 180 may transmit an ON control signal of the selected sensor to the selected external terminal when the time arrives based on a result of the received touch input.

FIG. 8 is a conceptual view for explaining an embodiment in which a sensor to be activated depending on a time is designated.

Referring to FIG. 8, an icon indicating a place at which the user is located at the time, and an icon indicating weather at the time and place may be displayed for each preset time.

For example, it will be predicted that a user is located in Seoul at 12 o'clock, and the weather of Seoul is clear at 12 o'clock. The user's schedule information or weather information may be stored in the terminal 100 or transmitted from the outside.

Specifically, the user's schedule information may be directly entered from the user, and the weather information may be transmitted from a base station or external server. Otherwise, the user may receive weather information from a specific web page.

Accordingly, an icon 810 corresponding to Seoul which is a place in which the user is to be located and an icon 820 indicating the weather of Seoul at 12 o'clock may be displayed in a region corresponding to 12 o'clock.

Furthermore, an icon 834 corresponding to smart glasses which are a wearable device expected to be worn at 12 o'clock and an icon 832 corresponding to a smart watch may be displayed on the human-shaped icon 830.

For an embodiment, information associated with a wearable device expected to be worn may be directly entered by the user or produced based on the information of a previously sensed wearable device. In other words, when the number of wearing the smart glasses and smart watch at 12 o'clock is greater than a preset value, an icon 834 corresponding to the smart glasses and an icon 832 corresponding to the smart watch will be displayed in a region corresponding to 12 o'clock.

Furthermore, a control signal for activating or deactivating the sensor may be transmitted according to sensor setting information set to each wearable device. For an embodiment, when the GPS sensor of the smart watch is set to an active state, a control signal for activating the GPS sensor may be transmitted to the smart watch at 12 o'clock.

On the other hand, the user may apply a preset touch input to change information set for each time. For an embodiment, when a long touch input is applied to an icon 840 corresponding to user location information displayed in a region corresponding to 16 o'clock, lists capable of changing the location information of the user will be unfolded (refer to an upper right end drawing of FIG. 8). Subsequently, the user may apply a touch input to a list 850 corresponding to a location to be changed among the lists to change a place to be located at 16 o'clock.

For another embodiment, when a long touch input is applied to an icon 832 corresponding to the smart watch displayed in a region corresponding to 12 o'clock, a menu 860 capable of controlling the on/off setting of the sensor provided in the smart watch may be displayed.

Specifically, the menu 860 may include an icon 862 corresponding to an NFC sensor provided in a smart watch, an icon 864 corresponding to a heart rate sensor, and an icon 866 corresponding to a GPS sensor. At this time, the icon 862 corresponding to the NFC sensor in an inactive state may be displayed with a dim image effect.

Subsequently, when the user applies a long touch input to the icon corresponding to the heart rate sensor in an active state, the heart rate sensor may be switched to an inactive state. Accordingly, only a control signal for activating the GPS sensor may be transmitted to the smart watch at 12 o'clock.

On the other hand, the controller 180 may execute a function of the sensor on a second external terminal to which a lower priority is given when a preset condition is not satisfied in connection with the function execution of the sensor on a first external terminal to which a higher priority is given, based on priorities given to the sensed at least one external terminal, respectively, for the function execution of the sensor.

For an embodiment, the controller 180 may execute a function of the sensor on a second external terminal to which a lower priority is given when a user's input event corresponding to the function execution of the sensor does not occur within a preset period of time on a first external terminal to which a higher priority is given, based on priorities given to the sensed at least one external terminal, respectively, for the function execution of the sensor.

For another embodiment, the controller 180 may change priorities given to the sensed at least one external terminal, respectively, for the function execution of the sensor, based on a preset touch input being applied thereto.

FIGS. 9A, 9B, 9C, 9D, 9E and 9F are conceptual views for explaining an embodiment associated with a priority given to an external terminal for the function execution of the sensor.

Figure 9A:
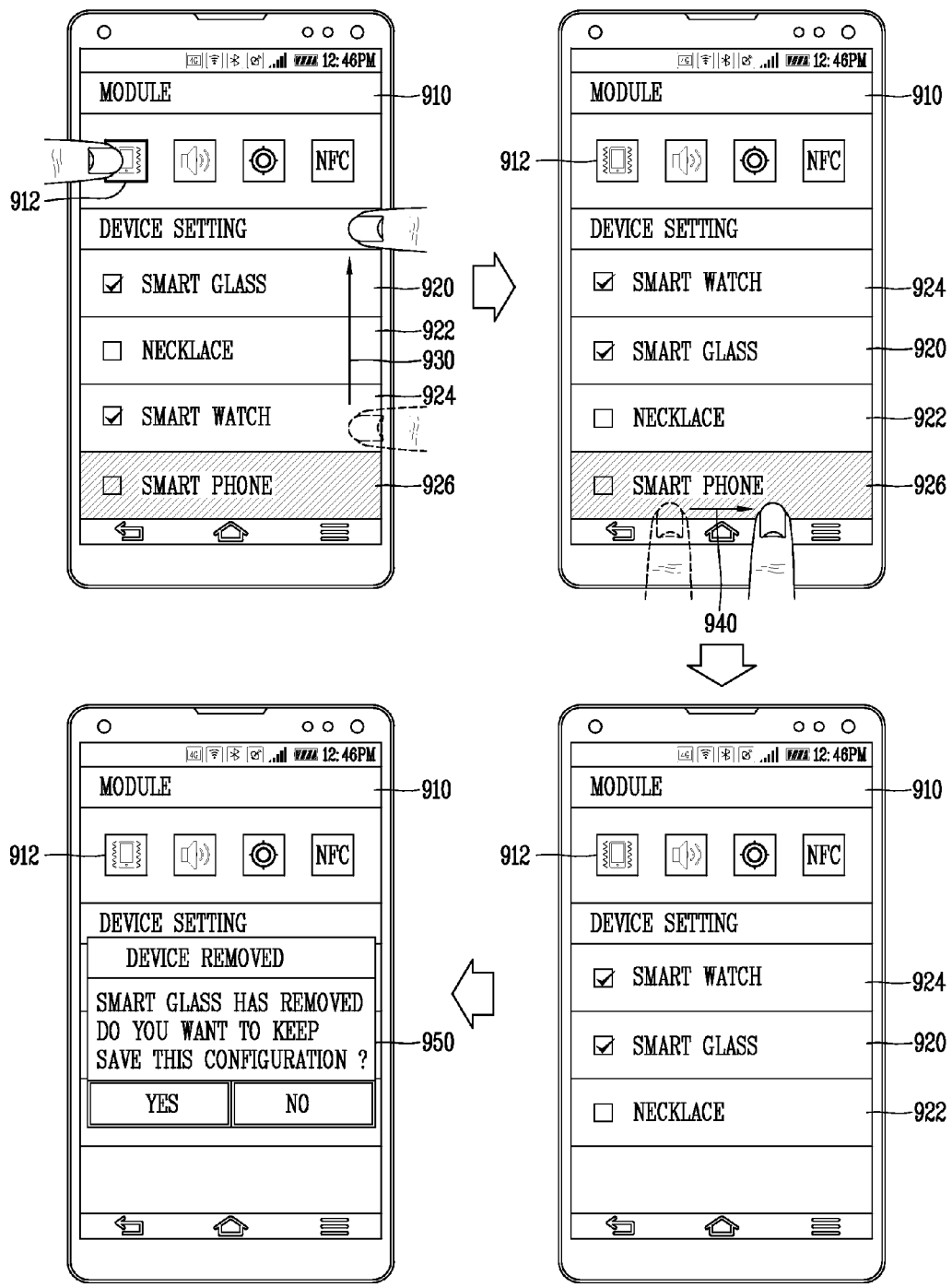
FIGS. 9A, 9B, 9C, 9D, 9E and 9F are conceptual views for explaining an embodiment associated with a priority given to an external terminal for the function execution of the sensor.

Referring to FIG. 9A, a screen 910 capable of setting the priority of a sensor and an external terminal associated with the sensor may be displayed. Icons corresponding to a plurality of sensors, respectively, may be displayed on the screen 910, and the user may apply a touch input to an icon 912 corresponding to a vibration sensor which is one of the icons to select the vibration sensor.

Accordingly, a list of external terminals may be displayed according to a priority given to the execution of the vibration sensor. Specifically, the list may include a menu 920 corresponding to smart glasses, a menu 922 corresponding to a smart necklace, a menu 924 corresponding to a smart watch, and a menu 926 corresponding to a smart phone may be sequentially displayed.

When the function of the vibration sensor is executed upon the reception of a message or call according to the priority, first, vibration may be generated from the smart glasses. At this time, when the user does not check the message or receive the call within a preset period of time, vibration may be generated from the smart necklace, which is a terminal having a lower priority than the smart glasses.

Similarly, when the user does not check the message or receive the call within a preset period of time, vibration may be generated from the smart watch, which is a terminal having a lower priority than the smart necklace.

In a similar manner, when the user does not check the message or receive the call within a preset period of time, vibration may be generated from the smart phone, which is a terminal having a lower priority than the smart watch. In other words, the function of the vibration sensor may be sequentially executed in an external terminal in the order listed in the list.

On the other hand, a menu corresponding to a wearable device may be differently displayed according to the state of a currently sensed wearable device.

For an embodiment, when a smart phone is not sensed in a current state, a dim image effect may be displayed on a menu 926 corresponding to the smart phone. Furthermore, the user may select only part of wearable devices to which priorities are given as terminals for function execution. In other words, the function of the vibration sensor may be executed only for the smart glasses and smart watch displayed with a check indicator using a touch input to the check box.

According to such an embodiment, vibration may be preferentially generated from the smart glasses while receiving a message. At this time, when the message is not checked within a preset period of time, vibration may be generated from the smart watch displayed with a check indicator using a touch input to the check box. In other words, vibration is not generated from the smart necklace that has not received a touch input to the check box. Furthermore, even when the message is not checked within a preset period of time after vibration is generated from the smart watch, vibration is not generated from the smart phone that is not sensed.

On the other hand, for another embodiment, the user may apply a drag input to change a priority given to a wearable device.

Specifically, the user may apply an input for dragging the menu 924 corresponding to the smart watch to an upper side of the menu 920 corresponding to the smart glasses to which the highest priority is given. Accordingly, referring to an upper right end drawing of FIG. 9A, the highest priority is given to the smart watch, and the priorities of the remaining wearable devices are shifted. In other words, the user may apply an input for dragging it to a position corresponding to his or her desired order to change a priority given to the wearable device.

For another embodiment, the user may apply a swipe input 940 to a menu corresponding to a wearable device that is not sensed, namely, the menu 926 corresponding to the smart phone. Accordingly, referring to a lower right end drawing of FIG. 9A, the menu 926 corresponding to the smart phone may disappear.

For still another embodiment, referring to a lower left end drawing of FIG. 9A, when connection to a will be described is released, a pop-up window 950 for asking whether or not to delete a menu corresponding to the wearable device from which connection is released may be displayed.

Accordingly, when the user deletes a menu corresponding to the smart glasses, a priority given to the smart glasses may be released. On the contrary, when the user does not delete a menu corresponding to the smart glasses, a priority given to the smart glasses may be maintained. In other words, when connected to the smart glasses again even though connection to the smart glasses is currently released not to operate the vibration sensor, the vibration sensor of the smart glasses may operate according to a priority that has been given thereto.

Figure 9B:
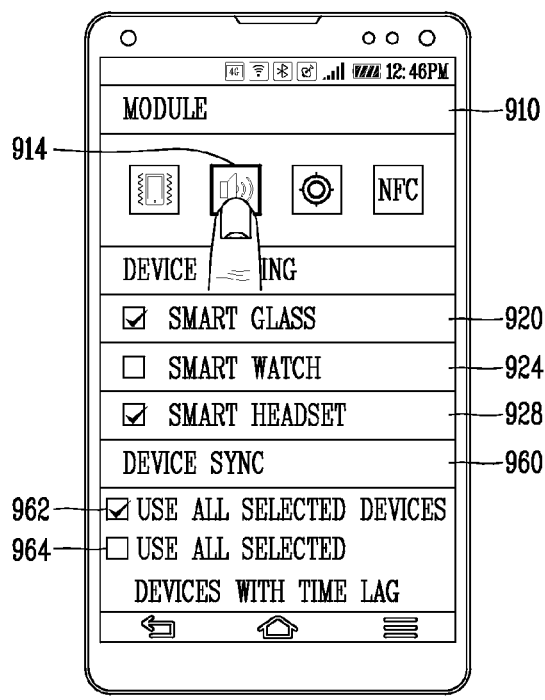

For yet still another embodiment, referring to FIG. 9B, a screen 910 capable of setting the priority of an external terminal associated with the sensor may be displayed as illustrated in FIG. 9A. Icons corresponding to a plurality of sensors, respectively, may be displayed on the screen 910, and the user may apply a touch input to the icon 914 corresponding to an acoustic sensor which is one of the icons to select the acoustic sensor.

Accordingly, a list of external terminals may be displayed according to a priority given to the acoustic sensor. Specifically, the list may include a menu 920 corresponding to the smart glasses, a menu 924 corresponding to the smart watch, and a menu 928 corresponding to the smart headset in a sequential manner. Furthermore, as described above, a touch input may be applied to the check box to execute the acoustic sensor in only the smart glasses and smart headset displayed with a check indicator.

For still yet another embodiment, a menu 960 associated with the synchronization of an external terminal may be displayed on the screen 910. According to an embodiment, items 962, 964 associated with executing sensors at the same time or with a time lag on external terminals in which the sensors are activated.

Specifically, a touch input may be applied to a check box of the item 962 for executing the functions of the sensors at the same time to display a check indicator. Accordingly, when a message is received, sound notifications for message received may be output from the smart glasses and smart headset at the same time. In other words, priorities given to external terminals may not be temporarily applied.

Figure 9C:
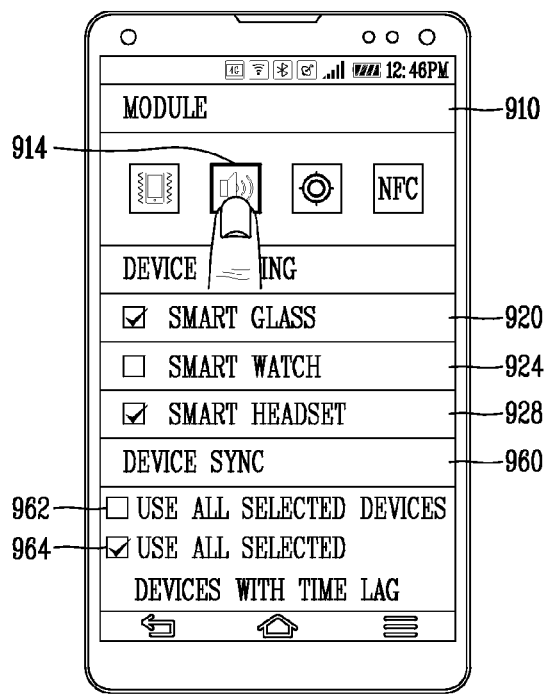

For yet still another embodiment, referring to FIG. 9C, a touch input may be applied to a check box of the item 964 for executing the functions of the sensors with a time lag to display a check indicator. Accordingly, when a message is received, sound notifications for message received may be output according to priorities given to external terminals.

Specifically, when a message is received, sound notification for message received may be first output to the smart glasses. At this time, when the message is not checked within a preset period of time, sound notification for message received may be output from the smart headset for which the execution of the function is selected with a lower priority. In other words, as illustrated in the embodiment described in FIG. 9A, the function of audio output may be executed according to priorities given to external terminals.

Figure 9D:
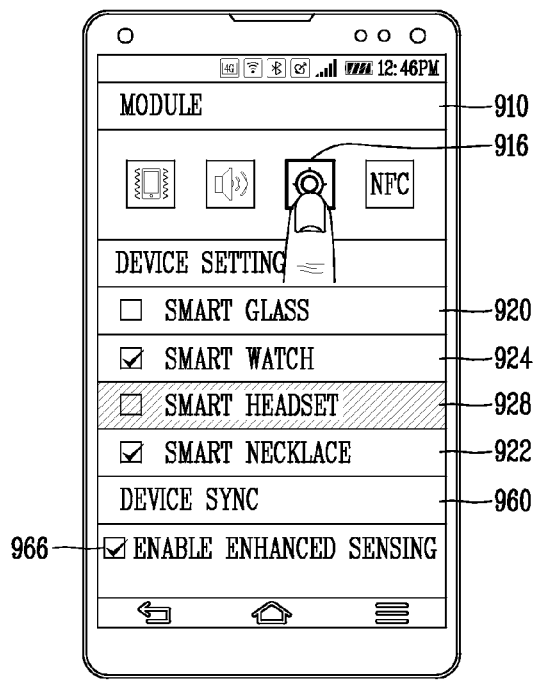

For still yet another embodiment, referring to FIG. 9D, when the user applies a touch input to an icon 916 corresponding to the GPS sensor to select it, a list of wearable devices may be displayed according to priorities given to the execution of the GPS sensor.

Specifically, the list may include a menu 920 corresponding to the smart glasses, a menu 924 corresponding to the smart watch, a menu 928 corresponding to smart headset and a menu 922 corresponding to the smart necklace in a sequential manner. According to the foregoing embodiment, the GPS sensor may be operated only on the smart watch and smart necklace for which the check indicator is displayed by applying a touch input to the check box. At this time, the menu 928 corresponding to a smart headset not connected thereto may be displayed along with a dim image effect.

Furthermore, a menu 960 associated with the synchronization of an external terminal may be displayed on the screen 910. At this time, the menu may include an item 966 associated with collecting the processing results of the sensor, and a check indicator may be displayed when a touch input is applied to a check box of the item 966.

In this manner, when the item 966 is selected, the processing results derived from each sensor provided in a plurality of external terminals may be collected. For an embodiment, GPS signals produced from the smart watch and smart necklace, respectively, may be received to produce one accurate location information. It may be also applicable to the other sensors in a similar manner. For example, after receiving a plurality of voice signals, respectively, a voice signal with low noise may be separated therefrom or the result values of a plurality of heart rate sensors may be combined to derive an accurate heart rate.

According to an embodiment illustrated in FIG. 9D, though the highest priority is given to the smart glasses, the check indicator is not displayed thereon, and thus the GPS sensor is operated on the smart watch. Subsequently, the smart headset is not connected thereto, and thus the GPS sensor is operated on the smart necklace. At this time, GPS sensors provided on the smart watch and smart necklace, respectively, may be operated at the same time, and the GPS sensor provided in the smart watch is first operated and then the playback section provided in the smart necklace is operated with a time lag.

Accordingly, GPS signals derived from GPS sensors provided in the smart watch and smart glasses, respectively, are received to produce one accurate location information based on them.

Figure 9E:
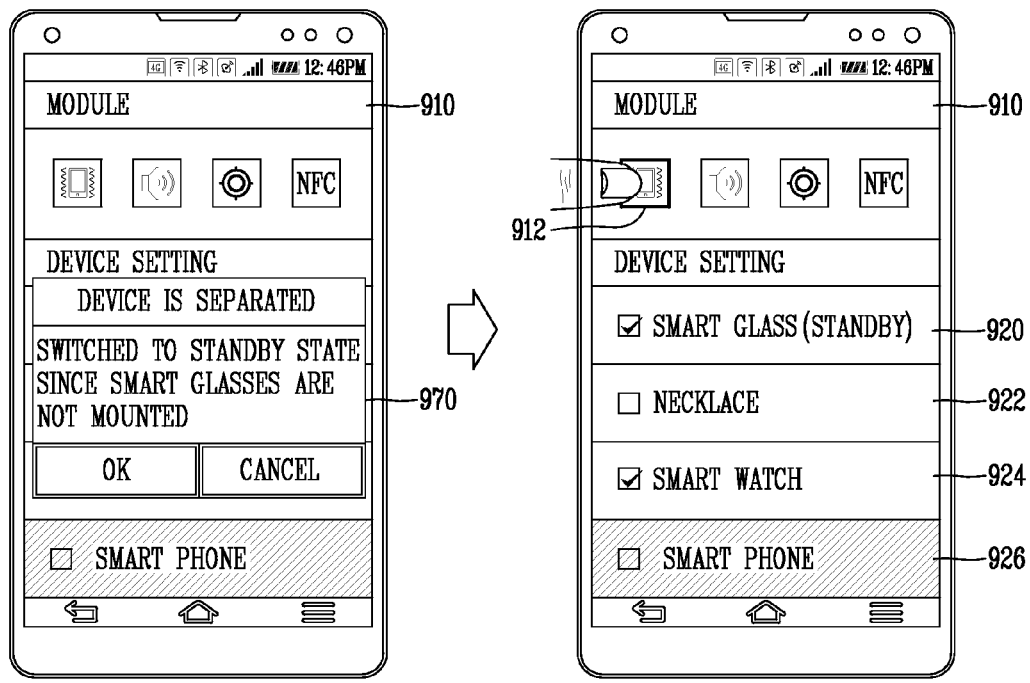

For another embodiment, referring to FIG. 9E, when the user no longer wears a wearable device connected thereto, a pop-up window indicating this may be displayed. Specifically, the user puts off the smart glasses connected thereto (or paired therewith), a pop-up window 970 indicating that it is switched to a standby state since he or she does not wear the smart glasses may be displayed.

For an embodiment, whether or not the smart watch, smart necklace, smart headset or the like is mounted thereon may be checked using a heart rate sensor or touch sensor. Furthermore, whether or not it is used may be determined by polling the state of the wearable device at a preset time.

Furthermore, a message indicating that the smart glasses are in a standby state may be displayed on the menu 920 corresponding to the smart glasses.

For another embodiment, when the smart glasses are switched to a standby state, the priority of the smart glasses associated with the execution of each sensor is pulled down to the lowest priority. Specifically, the vibration sensor may be preferentially operated on the smart watch displayed with a check indicator on a check box associated with the function execution of the vibration sensor among terminals having a lower priority than the smart glasses.

On the other hand, when the user wears the smart glasses again, a priority pulled down to the lowest priority may be set to a previous state. Accordingly, the vibration sensor may be preferentially executed on the smart glasses.

Figure 9F:
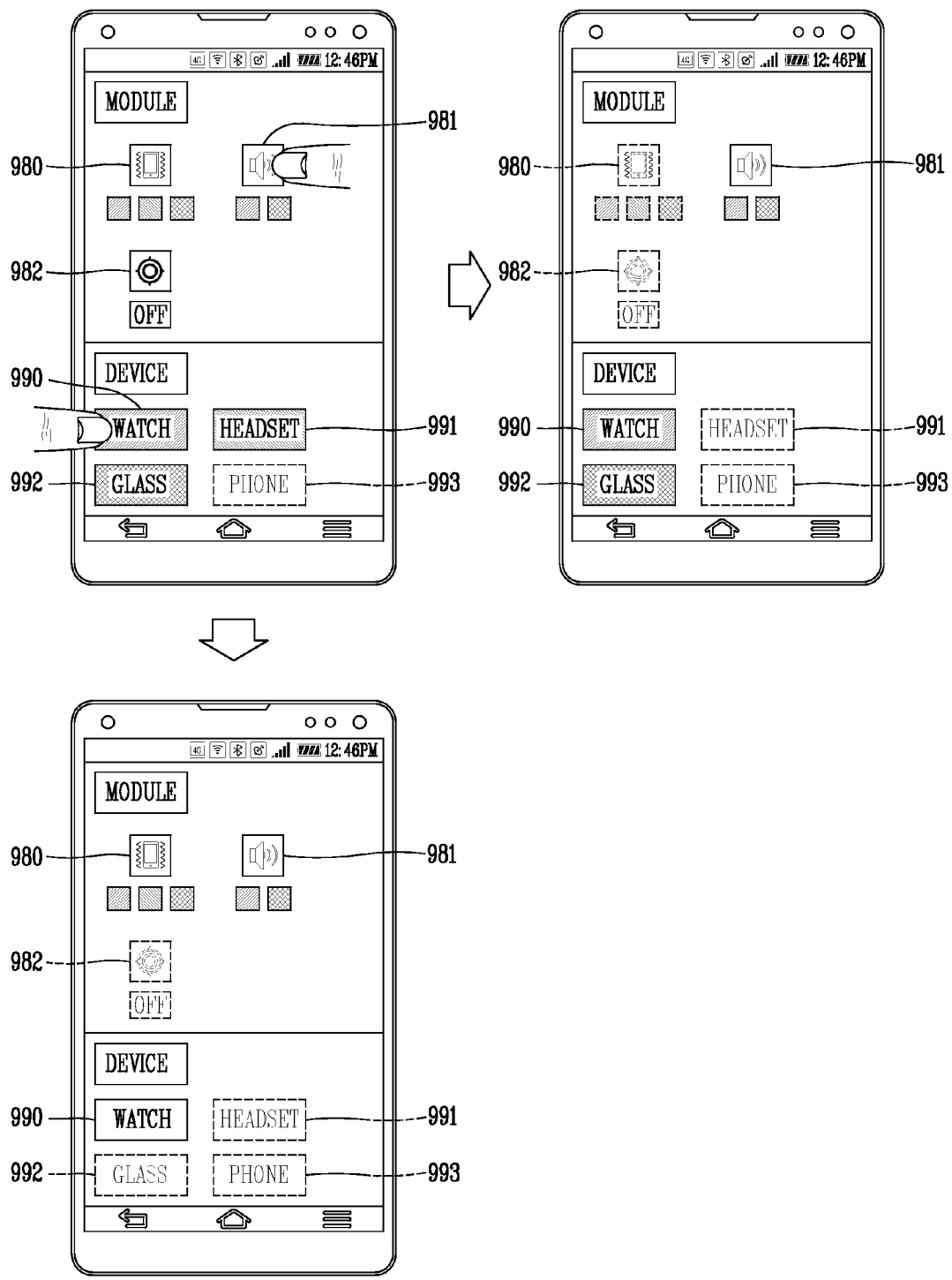

For still another embodiment, referring to FIG. 9F, icons corresponding to a plurality of sensors may be displayed with different colors or shapes. For example, an icon 980 corresponding to a vibration sensor, an icon 981 corresponding to an audio output sensor, and an icon 982 corresponding to a GPS sensor may be different colors or shapes.

Furthermore, icons corresponding to external terminals connected thereto may be displayed with different colors or shapes. For example, an icon 990 corresponding to the smart watch, an icon 991 corresponding to the smart headset, and an icon 993 corresponding to the smart phone may be displayed with different colors or shapes. Here, the icon 993 corresponding to the smart phone registered therewith but not connected thereto may be displayed with a semi-transparent manner.

On the other hand, the priority of an external terminal corresponding to thereto may be displayed at a lower end of the icons 980, 981, 982 corresponding to the sensors, respectively.

Specifically, an icon having the same color or shape as that of the icon 990 corresponding to the smart watch, an icon having the same color or shape as that of the icon 991 corresponding to the smart headset, and an icon having the same color or shape as that of the icon 992 corresponding to the smart glasses may be sequentially displayed at a lower end of the icon 980 corresponding to the vibration sensor. Accordingly, it may be acknowledged that priorities for activating the vibration sensor are the smart watch, smart headset and smart glasses.

Similarly, an icon having the same color or shape as that of the icon 990 corresponding to the smart watch, and an icon having the same color or shape as that of the icon 992 corresponding to the smart glasses may be sequentially displayed at a lower end of the icon 981 corresponding to the audio output sensor. Accordingly, it may be acknowledged that priorities for activating the audio output sensor are the smart watch and smart glasses.

Furthermore, an "OFF" indicator indicating that there is no terminal on which the GPS sensor is activated may be displayed at a lower end of the icon 982 corresponding to the GPS sensor.

Subsequently, the user may apply a touch input to the icon 981 corresponding to the audio output sensor to select the audio output sensor. Accordingly, referring to an upper right end drawing of FIG. 9F, icons 980, 982 corresponding to the remaining sensors other than the icon 981 corresponding to the audio output sensor may be displayed in a semi-transparent manner.

Furthermore, icons 991, 993 corresponding to external terminals other than the icon corresponding to the smart watch the icon 992 corresponding to the smart glasses on which the execution of the audio output sensor is enabled may be displayed in a semi-transparent manner. In other words, a wearable device on which the execution of the audio output sensor is enabled may be acknowledged.

At this time, the user may apply a touch input to an icon corresponding to the wearable device to change the on/off state of the audio output sensor. Specifically, when a long touch input is applied to the icon 990 corresponding to the smart watch, the audio output sensor of the smart watch may be switched to an inactive state to display the icon 990 in a semi-transparent manner.

Similarly, when a long touch input is applied to the icon 991 corresponding to the smart headset, the audio output sensor of the smart headset may be switched to an active state to display the icon 990 in a clear visible manner.

If a long touch input is applied to the icon 993 corresponding to a smart phone not connected thereto, then a message pop-up window indicating this may be displayed.

Furthermore, icons 990, 992 corresponding to the wearable devices may be sequentially displayed according to the priorities of the function execution of the audio output sensor. In other words, the audio output sensor may be preferentially executed on the smart watch, and then executed on the smart glasses.

For an embodiment, the priorities may be controlled in response to a location change of the icons 990, 992 corresponding to the wearable devices according to a user's drag input. Furthermore, when the priorities are changed, priority information displayed on a lower end of the icon 981 of the audio output sensor may be updated in response to this.

For another embodiment, when a touch input is applied to an icon 980, 982 corresponding to a sensor displayed in a semi-transparent manner, the icon corresponding to the relevant sensor may be displayed in a clearly visible manner again, and the icon corresponding to the remaining sensor may be displayed in a semi-transparent manner. Furthermore, an icon corresponding to a wearable device on which the execution of the relevant sensor is enabled may be displayed in a clearly visible manner, and an icon corresponding to the other wearable device may be displayed in a semi-transparent manner.

On the other hand, referring to an upper left end drawing of FIG. 9F, when a touch input is applied to the icon 990 corresponding to the smart watch, the display state of the icon may be changed to indicate the setting information of sensors provided in the smart watch.

Specifically, icons 991, 992, 993 corresponding to terminals other than the smart watch and an icon 982 corresponding to the GPS sensor that is not activated on the smart watch may be displayed in a semi-transparent manner.

Furthermore, as illustrated in the foregoing embodiment, a touch input may be applied to change the on/off state of the sensor, and accordingly, the output state of an icon corresponding to the sensor may be changed. Similarly, a touch input may be applied to an icon corresponding to a terminal displayed in a semi-transparent manner to change the terminal for sensor setting, and accordingly, the output state of the icon corresponding to the terminal may be changed. For another embodiment, when a touch input is applied to an icon corresponding to a sensor that is not provided in the smart watch, a message pop-up window indicating this may be displayed.

On the other hand, the controller 180 may execute a function of the sensor on a second external terminal to which a lower priority is given when a preset condition is not satisfied in connection with the function execution of the sensor in a first external terminal to which a higher priority is given in a current mobile terminal user's state, based on priorities at which the function of the sensor is executed, given to the sensed at least one external terminal, respectively, for each preset mobile terminal user's state.

Furthermore, the controller 180 may change priorities given to the sensed at least one external terminal, respectively, for each of the preset mobile terminal user's state, based on a preset touch input being applied thereto.

For another embodiment, the controller 180 may change priorities given to the sensed at least one external terminal, respectively, for each of the preset mobile terminal user's state, based on history information on a sensor executed in the mobile terminal user's state and an external terminal on which the function of the sensor is executed.

In other words, priorities given to external terminals may be set for each sensor and user state. For an embodiment, the user state may be set in various ways such as in a meeting, sleeping, running, walking, driving and the like, and the state may be known based on the results sensed from a plurality of sensors.

For an embodiment, when the user is doing exercise, the priority of activating the heart rate sensor may be set to the order of the smart watch, smart glasses and smart glove. For another embodiment, when the user is in a meeting, the priority of activating the vibration sensor may be set to the order of the smart phone, smart watch and smart glasses.

Such a priority may be directly set by a user, or updated by the user's behavior pattern and the history of used devices and sensors. Specifically, a log on the operation of wearable devices in each user state may be collected and stored in the database, and then their weight values may be calculated for each device according to a use frequency for each period to produce the priority.

Figure 10:
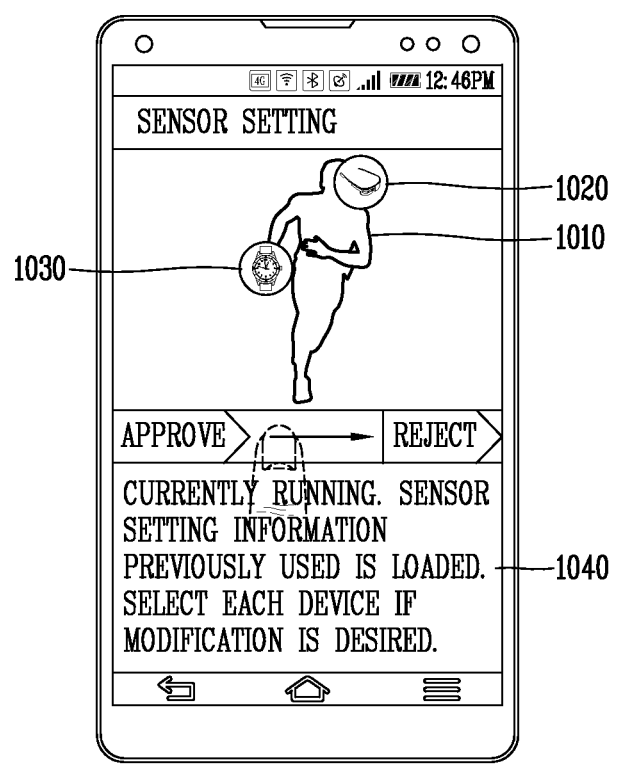
FIG. 10 is a conceptual view for explaining an embodiment associated with a priority given to an external terminal according to user's situation.

FIG. 10 is a conceptual view for explaining an embodiment associated with a priority given to an external terminal according to user's situation.

Referring to FIG. 10, when a current user's state is recognized as doing his or her running exercise, an icon 1010 corresponding to the shape of a running person may be displayed on the sensor setting screen. Furthermore, an icon 1020 corresponding to the smart glasses and an icon 1030 corresponding to the smart watch which are sensed wearable devices may be displayed on the icon 1010 corresponding to the shape of a running person.

At this time, a menu window 1040 showing a current state may be displayed at a lower end of the sensor setting screen. For an embodiment, a message indicating that the user is currently running, and asking whether or not to set it again according to sensor setting information that has been previously set for running may be displayed on the menu window 1040.

For another embodiment, when there is no information that has been set or used, a message indicating that the user is currently running, and asking whether or not to use automatic sensor setting information may be displayed on the menu window 1040.

Accordingly, the user may apply a drag input to a bar that allows him or her to approve or reject it, thereby determining whether to apply previous sensor setting information again or apply automatic sensor setting information.

On the other hand, the controller 180 may execute a function of the sensor in an external terminal selected in response to an event when the event occurs, based on a user input applied to select an external terminal on which the function of the sensor is executed for each of a plurality of preset events in connection with the sensor.

Figure 11A:
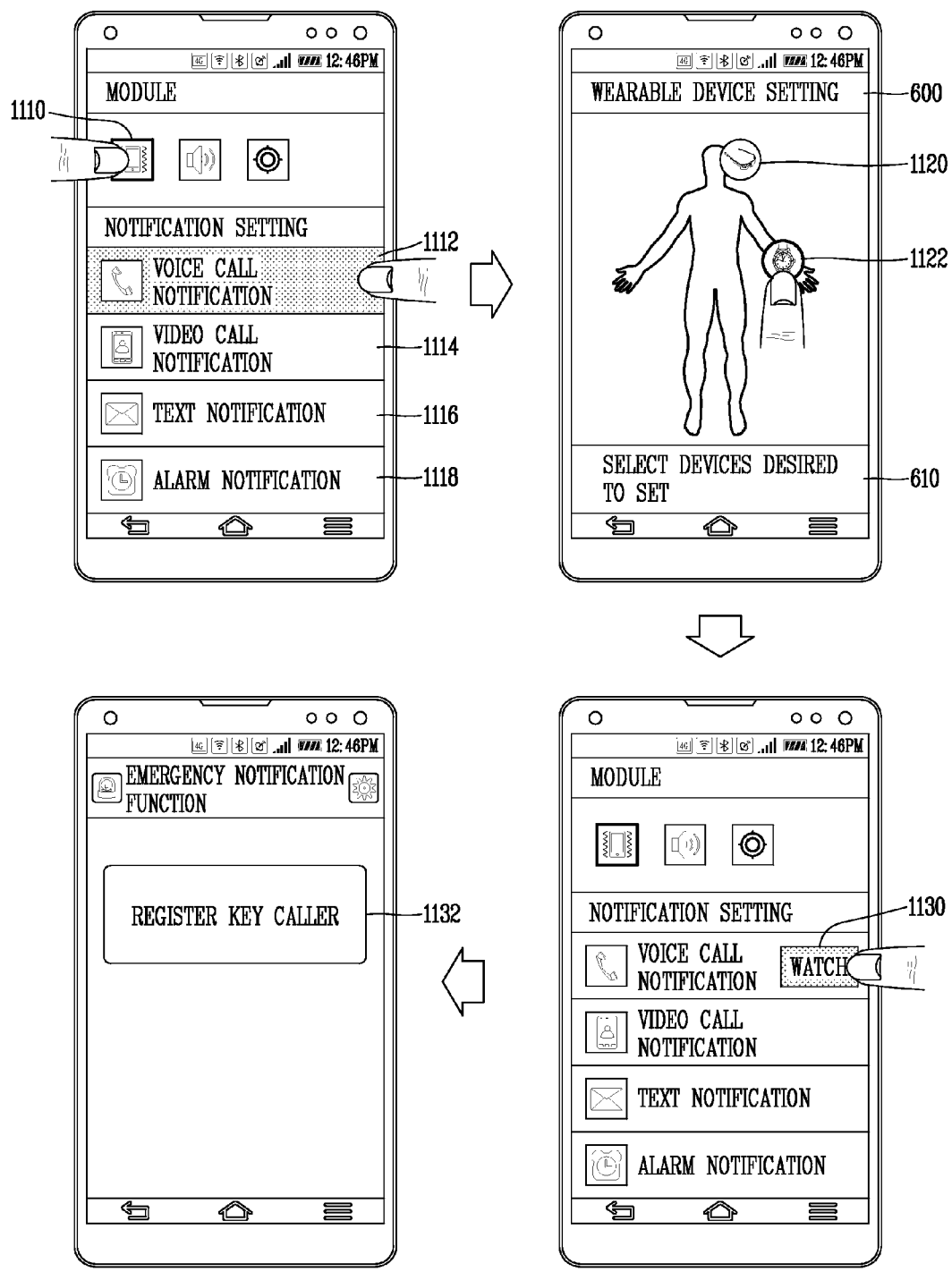
FIGS. 11A and 11B are conceptual views for explaining an embodiment associated with the designation of an external terminal according to an event corresponding to the sensor.
Figure 11B:
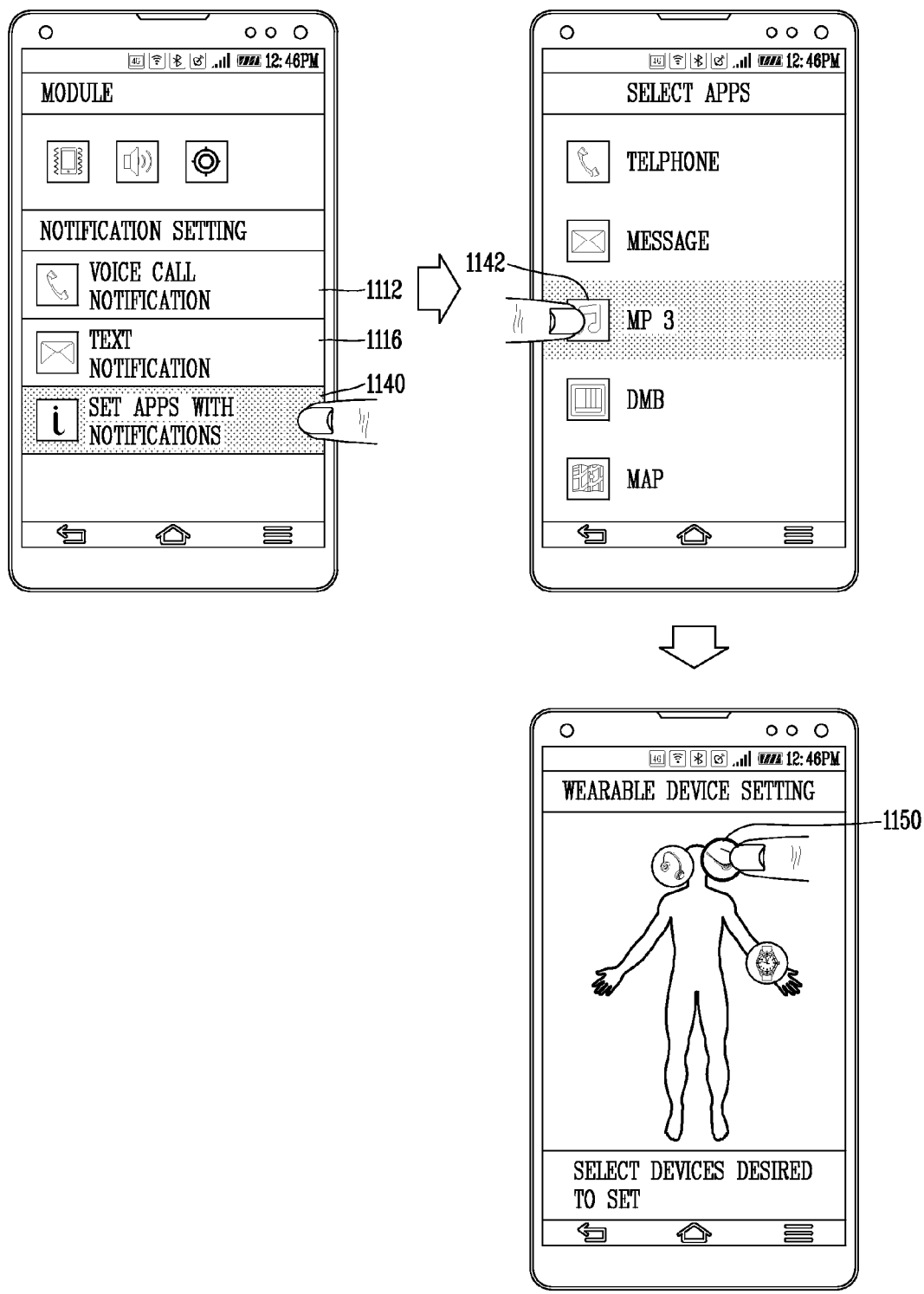

FIGS. 11A and 11B are conceptual views for explaining an embodiment associated with the designation of an external terminal according to an event corresponding to the sensor.

Referring to FIG. 11A, when a touch input is applied to an icon 1110 corresponding to the vibration sensor, menus corresponding to a situation in which the vibration sensor is executed may be displayed. Specifically, a menu 1112 corresponding to reception of a voice call, a menu 1114 corresponding to reception of a video call, a menu 1116 corresponding to reception of a text message, and a menu 1118 corresponding to notification of time may be displayed.

Subsequently, when a long touch input is applied to the menu 1112 corresponding to reception of a voice call, a screen capable of selecting a wearable device from which vibration is generated during the reception of a voice call may be displayed. Specifically, an icon 1120 corresponding to the smart glasses and an icon 1122 corresponding to the smart watch which are wearable devices connected thereto may be displayed on the screen. At this time, the user may apply a touch input to the icon 1122 of the smart watch to select the smart watch as a device from which vibration is generated during the reception of a voice call.

In other words, a different device may be set for each situation. For example, the smart glasses may be set as a device from which vibration is generated during the reception of a video call. Accordingly, the user may intuitively know that a video call has been received when vibration is generated from the smart glasses, and a voice call has been received when vibration is generated from the smart watch.

As the smart watch is selected as a device from which vibration is generated during the reception of a voice call, an icon 1130 corresponding to the smart watch may be displayed on the menu 1112 corresponding to reception of a voice call.

For another embodiment, when the user applies a touch input to the icon 1130, a screen for the setting of an emergency notification function may be displayed. Specifically, a menu 1132 for registering a key caller may be displayed, and the user may apply a touch input to the menu 1132 to register the key caller. Accordingly, when "A" is registered therewith, vibration is generated from all wearable devices when a voice call is received from "A".

For still another embodiment, a keyword may be registered in connection with reception notification of a text message. Accordingly, "when a keyword "schedule" is registered therewith, vibration is generated from all wearable devices when the keyword "schedule" is contained in the received text message.

For yet still another embodiment, referring to FIG. 11B, when a touch input is applied to a menu 1140 corresponding to app notification which is one of menus corresponding to situations in which the vibration sensor is executed, app lists for generating notification may be displayed. The user may apply a touch input to an icon 1142 corresponding to an application for which notification setting is desired to select it.

Subsequently, when an event occurs on the application, the user may select a wearable device from which notification rings. Specifically, when a long touch input is applied to an icon 1150 of the smart glasses, vibration may be generated from the smart glasses when an event such as update, receive information, or the like occurs on the application.

For still yet another embodiment, a wearable device from which vibration is generated may be set for each type of events occurring on the application. Specifically, when a specific keyword is contained in a message received at the application, it may be set such that vibration is generated from the smart headset. Otherwise, when a registered macro event occurs, it may be set such that vibration is generated from all wearable devices.

The effect of a mobile terminal and a control method thereof according to the present disclosure will be described as follows.

According to at least one of the embodiments of the present disclosure, it may have an advantage of avoiding redundant use of the same sensor, thereby reducing energy consumption.

According to at least one of the embodiments of the present disclosure, it may have an advantage of preventing a different sensing value from being derived.

The foregoing present invention may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the mobile terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal comprising:
a first sensor to sense at least one of a plurality of external terminals each having a second sensor operating within the range of the first sensor;
a display to display an icon corresponding to the first sensor and an icon for each at least one external terminal, respectively; and
a controller to control the transmission of a control signal to select an external terminal from among the at least one external terminal based on a first user input involving the displayed icon corresponding to the first sensor and the displayed icon corresponding to the selected external terminal,
wherein the selected external terminal is a first external terminal, and
wherein the controller further controls the transmission of a second control signal to a second selected external terminal, the second control signal controlling the function of a sensor in the second external terminal when a condition associated with the function of a sensor in the first external terminal is not satisfied.

2. The mobile terminal of claim 1, wherein the first user input involves dragging the icon corresponding to the first sensor to the icon corresponding to the selected external terminal.

3. The mobile terminal of claim 2, wherein the display displays a plurality of icons, each corresponding to one of a plurality of sensors, respectively, in the selected external terminal based on another user input involving the icon corresponding to the selected external terminal, and wherein the first user input involves the icon corresponding to the first sensor and one of the plurality of icons corresponding to the plurality of sensors in the selected external terminal.

4. The mobile terminal of claim 1, wherein the control signal is an ON control signal transmitted to the selected external terminal.

5. The mobile terminal of claim 4, wherein the controller controls the transmission of the ON control signal at a time defined by another user input.

6. The mobile terminal of claim 4, wherein the controller controls the transmission of an OFF control signal to any unselected external terminal from among the at least one external terminal sensed by the first sensor.

7. The mobile terminal of claim 1, wherein the second control signal controls the sensor in the second external terminal to function after the expiration of a time period associated with the condition not being satisfied.

8. The mobile terminal of claim 1, wherein the first external terminal has a higher priority than the second external terminal, and wherein the controller changes the priorities of the first external terminal and the second external terminal based on another user input, such that the second control signal controls the sensor in the first external terminal to function when a condition associated with the function of the sensor in the second external terminal is not satisfied.

9. The mobile terminal of claim 1, wherein there are two selected external terminals, the first external terminal and a second external terminal, the first external terminal having a higher priority than the second external terminal based on the state of the user of the mobile terminal, wherein the controller controls the transmission of a second control signal to the second external terminal, the second control signal controlling the function of a sensor in the second external terminal when a condition associated with the function of a sensor in the first external terminal is not satisfied.

10. The mobile terminal of claim 9, wherein the controller changes the priorities of the first external terminal and the second external terminal based on each of a number of preset mobile terminal user states, respectively, and in response to another user input.

11. The mobile terminal of claim 9, wherein the controller changes the priorities of the first external terminal and the second external terminal based on each of a number of preset mobile terminal user states, respectively, and based on history information relating to the mobile terminal user states and the corresponding use of the first external terminal and the second external terminal.

12. The mobile terminal of claim 1, wherein the controller controls the transmission of a second control signal to the first external terminal in response to the occurrence of one of a plurality of events, the second control signal controlling a sensor in the first external terminal based on the one event.

13. A control method of a mobile terminal having a first sensor, the method comprising:
sensing at least one of a plurality of external terminals each having a second sensor operating within the range of the first sensor in the mobile terminal;
displaying an icon corresponding to the first sensor and an icon for each at least one external terminal, respectively; and
transmitting a control signal to select an external terminal from among the at least one external terminal based on a first user input involving the displayed icon corresponding to the first sensor and the displayed icon corresponding to the selected external terminal,
wherein the selected external terminal is a first external terminal, and
wherein the method further comprises:
transmitting a second control signal to a second selected external terminal, the second control signal controlling the function of a sensor in the second external terminal when a condition associated with the function of a sensor in the first external terminal is not satisfied.

14. The method of claim 13, wherein transmitting the control signal comprises:
transmitting an ON control signal to the selected external terminal.

15. The method of claim 14, wherein transmitting the ON control signal comprises:
transmitting the ON control signal based on a user input that involves dragging the icon corresponding to the first sensor to the icon corresponding to the selected external terminal.

16. The method of claim 14, wherein transmitting the ON control signal comprises:
transmitting the ON control signal at a time defined by another user input.

17. The method of claim 14 further comprising:
transmitting an OFF control signal to any unselected external terminal from among the at least one external terminal sensed by the first sensor.

18. The method of claim 13, wherein transmitting the control signal comprises:
displaying a plurality of icons, each corresponding to one of a plurality of sensors, respectively, in the selected external terminal based on another user input involving the icon corresponding to the selected external terminal, and wherein the first user input involves the icon corresponding to the first sensor and one of the plurality of icons corresponding to the plurality of sensors in the selected external terminal.

19. The method of claim 13, wherein there are two selected external terminals, the first external terminal and a second external terminal, the first external terminal having a higher priority than the second external terminal based on the state of the user of the mobile terminal, and wherein the method further comprises:
- transmitting a second control signal to the second external terminal, the second control signal controlling the function of a sensor in the second external terminal when a condition associated with the function of a sensor in the first external terminal is not satisfied.

20. The method of claim 13 further comprising:
- transmitting a second control signal to the first external terminal in response to the occurrence of one of a plurality of events, the second control signal controlling a sensor in the first external terminal based on the one event.

\* \* \* \* \*